US007409015B1

(12) United States Patent
Misra et al.

(10) Patent No.: US 7,409,015 B1
(45) Date of Patent: Aug. 5, 2008

(54) ADAPTIVE MODULATION SCHEME BASED ON CUTOFF RATE WITH IMPERFECT CHANNEL STATE INFORMATION

(75) Inventors: Saswat Misra, Potomac, MD (US); Ananthram Swami, Silver Spring, MD (US)

(73) Assignee: The United States as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/288,270

(22) Filed: Nov. 29, 2005

(51) Int. Cl.
*H04L 27/22* (2006.01)
*H03D 3/00* (2006.01)

(52) U.S. Cl. .................... 375/329; 329/304
(58) Field of Classification Search ............. 375/316, 375/259, 279, 280, 281, 329, 332, 377; 332/119, 332/144; 329/204, 304
See application file for complete search history.

(56) References Cited

U.S. PATENT DOCUMENTS

| | | | | |
|---|---|---|---|---|
| 3,969,617 | A * | 7/1976 | Fontanes | 708/270 |
| 4,920,534 | A * | 4/1990 | Adelmann et al. | 370/474 |
| 5,495,502 | A * | 2/1996 | Andersen | 375/235 |
| 5,648,985 | A * | 7/1997 | Bjerede et al. | 375/219 |
| 6,005,896 | A * | 12/1999 | Maruyama | 375/295 |
| 6,304,593 | B1* | 10/2001 | Alouini et al. | 375/216 |
| 6,316,975 | B1* | 11/2001 | O'Toole et al. | 327/156 |
| 6,581,179 | B1* | 6/2003 | Hassan | 714/776 |
| 6,771,706 | B2* | 8/2004 | Ling et al. | 375/267 |
| 6,868,276 | B2* | 3/2005 | Nissila | 455/504 |
| 2002/0168026 | A1* | 11/2002 | Khoini-Poorfard | 375/303 |
| 2002/0177447 | A1* | 11/2002 | Walton et al. | 455/452 |
| 2003/0043732 | A1* | 3/2003 | Walton et al. | 370/208 |
| 2003/0112744 | A1* | 6/2003 | Baum et al. | 370/206 |
| 2003/0138030 | A1* | 7/2003 | Gavnoudias et al. | 375/141 |
| 2005/0088314 | A1* | 4/2005 | O'Toole et al. | 340/825.36 |

OTHER PUBLICATIONS

Abou-Faycal, I, Binary adaptive coded pilot symbol assisted modulation over Rayleigh fading channels without feedback, IEEE Transactions on Communications, vol. 53, Issue 6, Jun. 2005 pp. 1036-1046.*
Medard, Muriel, Adaptive Coding for Pilot Symbol Assisted Modulation Without Feedback, http://web.mit.edu/medard/www/, document name: acm.ps, last modified: Dec. 3, 2002.*

(Continued)

*Primary Examiner*—Tesfaldet Bocure
(74) *Attorney, Agent, or Firm*—Edward L. Stolarum; Guy M. Miller

(57) ABSTRACT

A cutoff rate may be used to determine an optimal binary input distribution for a communications system which operates with imperfect receiver channel state information (CSI) at the receiver. First, the cutoff rate may be evaluated and used to analyze the optimal binary input as a function of CSI quality and receiver Signal to Noise Ratio (SNR). Next, limiting distributions of BPSK and On-Off Keying (OOK) may be examined and an analytic design rule for adaptive modulation between these two inputs (as the receiver CSI changes) may be derived. The modulation scheme may provide near optimal performance by employing only these limiting distributions rather than the full spectrum of binary inputs. Finally, the results may be used to design an adaptive modulation scheme for Pilot Symbol Assisted Modulation (PSAM) systems.

10 Claims, 18 Drawing Sheets

OTHER PUBLICATIONS

Wikipedia, Rayleigh Fading, definition Rayleigh Fading, found Mar. 13, 2006 at www.wikipedia.org.*

Wayne E. Stark, Capacity and Cutoff Rate of Noncoherent FSK with Nonselective Rician Fading, IEEE Transactions on Communications, vol. COM-33, No. 11, Nov. 1985.*

Misra et al., "Cutoff Rate Analysis of the Guass-Markov Fading Channel with Binary Inputs and Partial CSI at the receiver," Conference on Information Sceince and System, Mar. 12-14, 2003, pp. 1-6.*

Misra et al., "Cutoff Rate Analysis of the Guass-Markov Fading Channel with Adaptive energy Allocation," IEEE Workshop on Signal Processing, pp. 388-391.*

Ling "Optimal Reception, Performance Bound, and Cutoff Rate Analysis of Reference Assisted Coherent CDMA Communication with Application," IEEE, 1999, pp. 1583-1592.*

I.Abou-Faycal, J. Médard, and U. Madhow, "Binary Adaptive Coded Pilot symbol Assisted Modulation over Rayleigh Fading Channels without Feedback," IEEE Trans Comm., vol. 53, No. 6, pp. 1036-1046, Jun. 2005.

I.Abou-Faycal, M. Trott, S. Shamai, "The Capacity of Discrete-Time Memoryless Rayleigh-Fading Channels," IEEE Trans. Info. Theory, vol. 47, No. 4, pp. 1290-1301, May 2001.

S. Adireddy, L. Tong, H. Viswanathan, "Optimal placement of training for frequency selective block-fading channels," IEEE Trans. Info. Theory, vol. 49, No. 8, pp. 2338-2353, Aug. 2002.

E. Arikan, "An upper bound on the cutoff rate of sequential decoding," IEEE Trans. Info. Theory, vol. 34, No. 1, pp. 53-63, Jan. 1988.

J. Baltersee, G. Fock, H. Meyr, "An Information Theoretic Foundation of Synchronized Detection," IEEE Trans. Comm., vol. 49, No. 12, pp. 2115-2123, Dec. 2001.

E. Biglieri, J. Proakis, and S. Shamai, "Fading channels: information-theoretic and communication aspects," IEEE Trans. Info., Theory, vol. 44, No. 6, pp. 2619-2692, Oct. 1998.

X. Cai and G. Giannakis, "Adaptive PSAM accounting for channel estimation and prediction errors," IEEE Trans. Wireless Comm., vol. 4, No. 1, pp. 246-256, Jan. 2005.

J.K. Cavers, "An analysis of pilot symbol assisted modulation for Rayleigh fading channels [Mobile Radio]," IEEE Trans. Veh. Tech., vol. 40, No. 4, pp. 686-693, Nov. 1991.

J.K. Cavers, "Variable-Rate Transmission for Rayleigh Fading Channels," IEEE Trans. Comm., vol. 20, No. 2, pp. 15-22, Feb. 1972.

R.R. Chen, B. Hajek, R. Koetter, and U. Madhow, "On Fixed input distributions for noncoherent communication over high SNR Rayleigh Fading Channels," IEEE Trans. Info. Theory, vol. 50, No. 12, pp. 3390-3396, Dec. 2004.

M. Dong, L. Tong, and B. Sadler, "Optimal insertion of pilot symbols for transmissions over time-varying flat fading channels," IEEE Trans. On Signal Processing, vol. 52, No. 5, pp. 1403-1418, May 2004.

X. Dong and L. Xiao, "Symbol error probability of two-dimensional signaling in Ricean fading with imperfect channel estimation," IEEE Trans, Vehicular Tech., vol. 54, No. 2, Mar. 2005.

R. Gallager, Information Theory and Reliable Communication. John Wiley and Sons, 1968, pp. 135-145.

M. Garcia and J. Paez-Borrallo, "Tracking of time misalignments for OFDM systems in multipath fading channels," IEEE Trans. Consumer Electronics, vol. 48, No. 4, pp. 982-989, Nov. 2002.

J.M. Geist, "The Cutoff Rate for On-Off Keying," IEEE Trans. Comm., vol. 39, No. 8, pp. 1179-1181, Aug. 1991.

D. Goeckel, "Adaptive Coding for Time-Varying Channels Using Outdated Fading Estimates," IEEE Trans. Comm., vol. 47, No. 6, pp. 844-855, Jun. 1999.

B. Hassibi and B. Hochwald, "How much training is needed in multiple-antenna wireless links?," IEEE Trans., Info. Theory, vol. 49, No. 4, pp. 951-963, Apr. 2003.

A.O. Hero and T.L. Marzetta, "Cutoff rate and signal design for the quasi-static Rayleigh fading space-time channel," IEEE Trans. Info. Theory, vol. 47, No. 6, pp. 2400-2416, Sep. 2001.

J. Huang and S. Meyn, "Characterization and Computation of Optimal Distributions for Channel Coding," Proc. 37th Annual Conference on Information Sciences and Systems, Mar. 2003.

W. Kuo and M.P. Fitz, "Frequency offset compensation of pilot symbol assisted modulation in frequency flat fading," IEEE Trans. Comm., vol. 45, No. 11, pp. 1412-1416, Nov. 1997.

K. Leeuwin-Boulle and J.C. Belfiore, "The cutoff rate of time-correlated fading channels," IEEE Trans. Info. Theory, vol. 39, No. 2, pp. 612-617, Mar. 1993.

X. Ma, G. Giannakis, and S. Ohno, "Optimal training for block transmissions over double selective wireless fading channels," IEEE Trans. Signal Processing, vol. 51, No. 5, pp. 1351-1366, May 2003.

T. Marzetta and B. Hochwald, "Capacity of a Mobile Multiple-antenna Communication Link in Rayleigh flat fading," IEEE Trans. Info. Theory, vol. 45, No. 1, pp. 139-157, Jan. 1999.

J. Massey, "Coding and Modulation in Digital Communications," In Proc. 1974 Int. Zurich Seminar, Digital Communication, Mar. 1974.

R. McEliece and W. Stark, "Channels with Block Interference," IEEE Trans., Info. Theory, vol. 30, No. 1, pp. 44-53, Jan. 1984.

S. Misra, A. Swami, and L. Tong, "Optimal Training for Time-Selective Wireless Fading Channels using Cutoff Rate," submitted to EURASIP Journal on Applied Signal Processing, Special issue on Reliable Communications over Rapidly Time-Varying Channels.

S. Ohno and G. Giannakis, "Capacity maximizing MMSE-Optimal pilots for wireless OFMD over frequency-selective block Rayleigh-fading channels," IEEE Trans. Info. Theory, vol. 50, No. 9, pp. 2138-2145, Sep. 2004.

A. Saleh and J. Salz, "On the Computational Cutoff Rate for the Peak-Power-Limited Gaussian Channel," IEEE Trans. Comm., vol. 35, No. 1, pp. 13-21, Jan. 1987.

S. Shamai, I. Bar-David, "The capacity of average and peak-power-limited quadrature Gaussian channels," IEEE Trans. Info. Theory, vol. 41, No. 4, pp. 1060-1071, Jul. 1995.

L. Tong, B. Sadler, and M. Dong, "Pilot-Assisted Wireless Transmissions," IEEE Signal Processing Magazine, pp. 12-25, Nov. 2004.

S. Verdú, "Spectral efficiency in the Wideband Regime," IEEE Trans. Info. Theory, vol. 48, No. 6, pp. 1319-1343, Jun. 2002.

S. Verdú, "On Channel Capacity per Unit Cost," IEEE Trans., Info. Theory, vol. 36, No. 5, pp. 1019-1030, Sep. 1990.

* cited by examiner

ADAPTIVE MODULATION SCHEME BASED ON CUTOFF RATE WITH IMPERFECT CHANNEL STATE INFORMATION

STATEMENT REGARDING FEDERALLY SPONSORED RESEARCH OR DEVELOPMENT

The invention described herein may be manufactured, used, and licensed by or for the United States Government.

TECHNICAL FIELD

The present disclosure is generally related to communications and, more particularly, is related to a system and method for selecting the modulation scheme for a wireless communication system using the cutoff rate metric.

BACKGROUND

Binary input distributions are often assumed when studying the reliable rates of communications systems, either through channel capacity or other related metrics. The widespread analysis of binary inputs follows from their tractability and optimality, or near optimality, at low Signal to Noise Ratio (SNR) under varying amounts of receiver channel state information (CSI). Rates are considered to be reliable if the probability of decoding error can be made arbitrarily small by increasing the code length in communications over a discrete-time Rayleigh flat-fading channel. It is assumed that the transmitter can select among the class of binary input distributions, and that imperfect (or partial) CSI is available at the receiver.

When perfect receiver CSI is available, it is well known that antipodal signaling (BPSK) maximizes the capacity of this channel among binary inputs. Conversely, without CSI at the receiver, On-Off keying (OOK) has been shown to be capacity maximizing. However, when only imperfect receiver CSI is available, it is not clear as to which strategy, even among these two, is optimal.

SUMMARY

Systems and methods for implementing an adaptive modulation scheme for use in communications systems are provided. Briefly described, a representative embodiment of such a system can be implemented as follows. A receiver is configured to sample a transmission on a communications channel, and a processor is configured to determine the cutoff rate of the communication channel corresponding to a sample of a transmission on the communication channel and adapt the modulation scheme for the communication channel corresponding to maximization of the cutoff rate.

A representative embodiment of such a method can be broadly summarized by the following steps: determining the cutoff rate of a communication channel; and adapting the modulation scheme for the communication channel corresponding to maximization of the cutoff rate.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
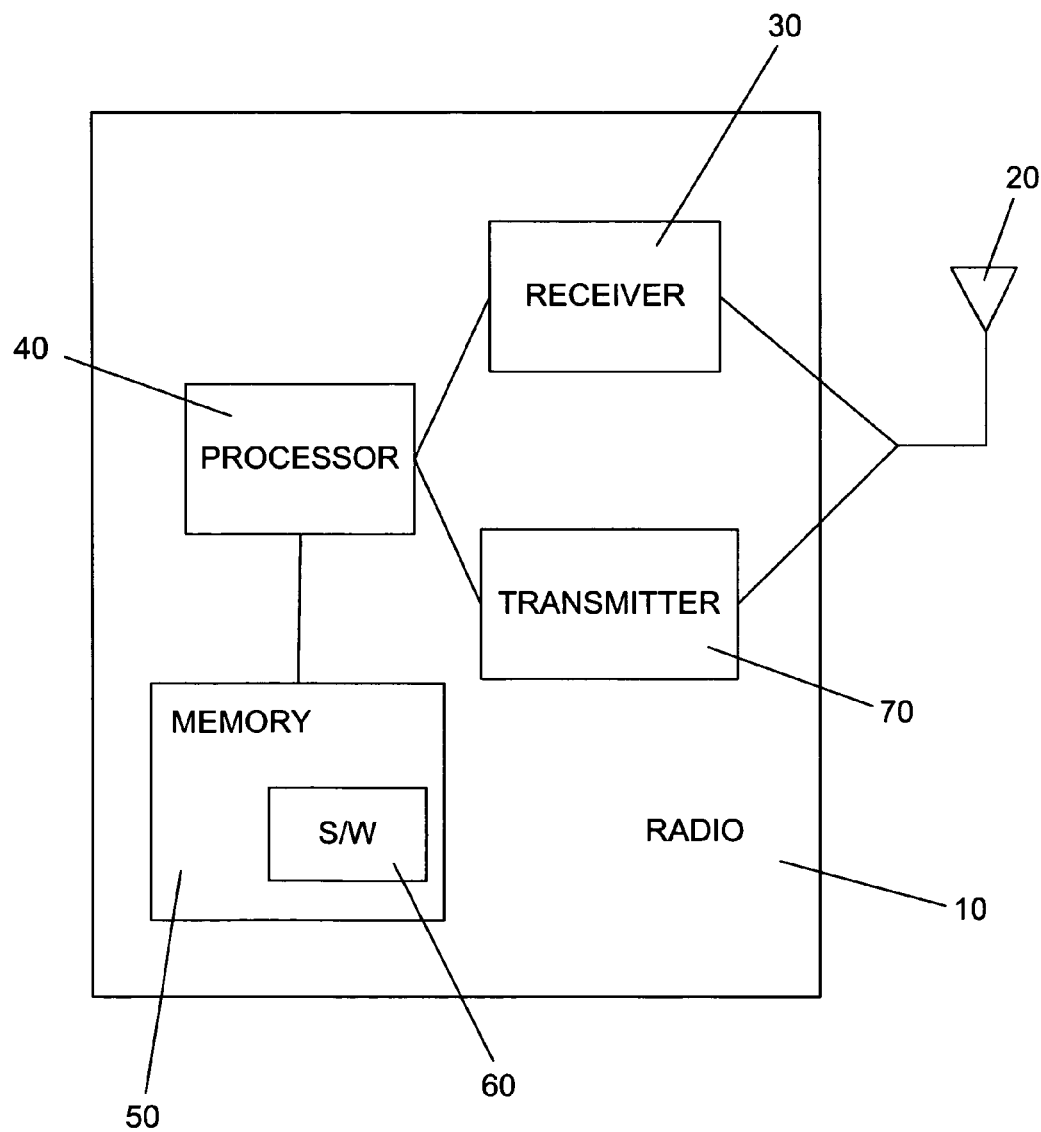
FIG. 1 is a system block diagram of an exemplary embodiment of an adaptive modulation system.

The cutoff rate $R_o$ is used to characterize reliable rates for wireless communications. It has been used to establish practical limits on coded performance under complexity constraints, and can often be evaluated in closed-form when the capacity cannot. Cutoff rate analysis has been used, and studies have been conducted for communications systems with full receiver channel state information (CSI) for both independent and temporally correlated fading, and for systems with no CSI (for independent fading). The cutoff rate is a lower bound on the channel capacity that also provides a bound on the random coding exponent, thereby characterizing the entire rate vs. performance curve via $P_e \leq 2^{-N(R_o-R)}$ where R is the rate and $P_e$ the probability of decoding error for length N codewords. Although certain encoding-decoding structures can achieve rates greater than $R_o$ (e.g., turbo coding with iterative decoding), the cutoff rate remains a metric of interest for these systems, as well as others. For example, in sequential decoding, the cutoff rate specifies the largest rate for which decoding complexity remains finite. The cutoff rate often leads to a tractable analysis that often would not be possible through direct evaluation of the random coding exponent or the capacity.

Many papers have been written in this area of communications including the following references: I. Abou-Faycal, J. Médard, and U. Madhow, "Binary Adaptive Coded Pilot symbol Assisted Modulation over Rayleigh Fading Channels without Feedback," *IEEE Trans. Comm.*, Vol. 53, No. 6, pp. 1036-1046, June 2005; I. Abou-Faycal, M. Trott, S. Shamai, "The Capacity of Discrete-Time Memoryless Rayleigh-Fading Channels," *IEEE Trans. Info. Theory*, Vol. 47, No. 4, pp. 1290-1301, May 2001; S. Adireddy, L. Tong, H. Viswanathan, "Optimal placement of training for frequency selective block-fading channels," *IEEE Trans. Info. Theory*, Vol. 49, No. 8, pp. 2338-2353, August 2002; E. Arikan, "An upper bound on the cutoff rate of sequential decoding," *IEEE Trans. Info. Theory*, Vol. 34, No. 1, pp. 53-63, January 1988; J. Baltersee, G. Fock, H. Meyr, "An Information Theoretic Foundation of Synchronized Detection," *IEEE Trans. Comm.*, Vol. 49, No. 12, pp. 2115-2123, December 2001; E. Biglieri, J. Proakis, and S. Shamai, "Fading channels: information-theoretic and communication aspects," *IEEE Trans. Info., Theory*, Vol. 44, No., 6, pp. 2619-2692, October 1998; X. Cai and G. Giannakis, "Adaptive PSAM accounting for channel estimation and prediction errors," *IEEE Trans. Wireless Comm.*, Vol. 4, No. 1, pp. 246-256, January 2005; J. K. Cavers, "An analysis of pilot symbol assisted modulation for Rayleigh fading channels [Mobile Radio]," *IEEE Trans. Veh. Tech.*, Vol. 40, No. 4, pp. 686-693, November 1991; J. K. Cavers, "Variable-Rate Transmission for Rayleigh Fading Channels," *IEEE Trans. Comm.*, Vol. 20, No. 2, pp. 15-22, February 1972; R. R. Chen, B. Hajek, R. Koetter, and U. Madhow, "On Fixed input distributions for noncoherent communication over high SNR Rayleigh Fading Channels," *IEEE Trans. Info. Theory*, Vol. 50, No. 12, pp. 3390-3396, December 2004; M. Dong, L. Tong, and B. Sadler, "Optimal insertion of pilot symbols for transmissions over time-varying flat fading channels," *IEEE Trans. On Signal Processing*, Vol. 52, No. 5, pp. 1403-1418, May 2004; X. Dong and L. Xiao, "Symbol error probability of two-dimensional signaling in Ricean fading with imperfect channel estimation," *IEEE Trans, Vehicular Tech.*, Vol. 54, No. 2, March 2005; R. Gallager, *Information Theory and Reliable Communication*. John Wiley and Sons, 1968; M. Garcia and J. Paez-Borrallo, "Tracking of time misalignments for OFDM systems in multipath fading channels," *IEEE Trans. Consumer Electronics*, Vol. 48, No. 4, pp. 982-989, November 2002; J. M. Geist, "The Cutoff Rate for On-Off Keying," *IEEE Trans. Comm.*, Vol. 39, No. 8, pp. 1179-1181, August 1991; D. Goeckel, "Adaptive Coding for Time-Varying Channels Using Outdated Fading Estimates," *IEEE Trans. Comm.*, Vol. 47, No. 6, pp. 844-855, June 1999; B. Hassibi and B. Hochwald, "How much training is needed in multiple-antenna wireless links?," *IEEE Trans., Info. Theory*, Vol. 49, No. 4, pp. 951-963, April 2003; A. O. Hero and T. L. Marzetta, "Cutoff rate and signal design for the quasi-static Rayleigh fading space-time channel," *IEEE Trans. Info. Theory*, Vol. 47, No. 6, pp. 2400-2416, September 2001; J. Huang and S. Meyn, "Characterization and Computation of Optimal Distributions for Channel Coding," *Proc. 3rd Annual Conference on Information Sciences and Systems*, March 2003; W. C. Jakes, Jr., *Microwave Mobile Communication*, New York: Wiley 1974; S. Jamali, and T. Le-Ngoc, *Coded-Modulation Techniques for Fading Channels*. Kluwer Publishers, 1994; W. Kuo and M. P. Fitz, "Frequency offset compensation of pilot symbol assisted modulation in frequency flat fading," *IEEE Trans. Comm.*, Vol. 45, No. 11, pp. 1412-1416, November 1997; K. Leeuwin-Boulle and J. C. Belfiore, "The cutoff rate of time-correlated fading channels," *IEEE Trans. Info. Theory*, Vol. 39, No. 2, pp. 612-617, March 1993; X. Ma, G. Giannakis, and S. Ohno, "Optimal training for block transmissions over double selective wireless fading channels," *IEEE Trans. Signal Processing*, Vol. 51, No. 5, pp. 1351-1366, May 2003; T. Marzetta and B. Hochwald, "Capacity of a Mobile Multiple-antenna Communication Link in Rayleigh flat fading," *IEEE Trans. Info. Theory*, Vol. 45, No. 1, pp. 139-157, January 1999; J. Massey, "Coding and Modulation in Digital Communications," *In Proc. 1974 Int. Zurich Seminar, Digital Communication*, March 1974; R. McEliece and W. Stark, "Channels with Block Interference," *IEEE Trans., Info. Theory*, Vol. 30, No. 1, pp. 44-53, January 1984; S. Misra, A. Swami, and L. Tong, "Optimal Training for Time-Selective Wireless Fading Channels using Cutoff Rate," submitted to *EURASIP Journal on Applied Signal Processing*, Special issue on Reliable Communications over Rapidly Time-Varying Channels; S. Ohno and G. Giannakis, "Capacity maximizing MMSE-Optimal pilots for wireless OFMD over frequency-selective block Rayleigh-fading channels," *IEEE Trans. Info. Theory*, Vol. 50, No. 9, pp. 2138-2145, September 2004; A. Saleh and J. Salz, "On the Computational Cutoff Rate, $R_o$, for the Peak-Power-Limited Gaussian Channel," *IEEE Trans. Comm.*, Vol. 35, No. 1, pp. 13-21, January 1987; S. Shamai, I. Bar-David, "The capacity of average and peak-power-limited quadrature Gaussian channels," *IEEE Trans. Info. Theory*, Vol. 41, No. 4, pp. 1060-1071, July 1995; L. Tong, B. Sadler, and M. Dong, "Pilot-Assisted Wireless Transmissions," *IEEE Signal Processing Magazine*, pp. 12-25, November 2004; S. Verdú, "Spectral efficiency in the Wideband Regime," *IEEE Trans. Info. Theory*, Vol. 48, No. 6, pp. 1319-1343, June 2002; and S. Verdú, "On Channel Capacity per Unit Cost," *IEEE Trans., Info. Theory*, Vol. 36, No.5, pp. 1019-1030, September 1990; which are incorporated by reference.

In this context, FIG. 1 depicts an embodiment of a portion of a communication system in which communication may be received on a Rayleigh fading channel. Specifically, the communication is received by antenna 20 and receiver 30. Communication system 10 may be implemented as a wireless radio, or other communication device. Such a communication device may include many wireless communication devices, including computers (desktop, portable, laptop, etc.), consumer electronic devices (e.g., multi-media players), compatible telecommunication devices, personal digital assistants (PDAs), or any other type of network devices, such as printers, fax machines, scanners, hubs, switches, routers, set-top boxes, televisions with communication capability, etc.

Receiver 30 relays the received communications to processor 40, which may perform an adaptive modulation algorithm 60 contained in memory 50. Memory 50 may be contained within processor 40, or located elsewhere internal to or external to the system. Processor 40 may include, but is not limited to, a digital signal processor (DSP), a microprocessor (MCU), a general purpose processor, and an application specific integrated circuit (ASIC), among others. After adaptive modulation algorithm 60 is performed, communications are transmitted by transmitter 70 using a modulation scheme derived with adaptive modulation algorithm 60.

More specifically, a Rayleigh fading channel with imperfect receiver CSI may be introduced and the corresponding cutoff rate may be examined under binary signaling using the normalized variance of the channel estimate, termed the CSI quality. The optimal binary input may be analyzed as a function of the SNR and CSI quality available at the receiver. The cutoff rate optimality of the limiting distributions, BPSK and On-Off Keying may be established to develop an analytic design rule that allows adaptive modulation between these distributions based on the receiver CSI quality. A modulation scheme may be devised that employs only these limiting distributions, rather than the full spectrum of binary inputs. An explicit Pilot Symbol Assisted Modulation (PSAM) front-end may be used to illustrate how results from the analysis can be applied to design an adaptive modulation scheme. Temporal correlation may be included in the channel model, and the cutoff rate may be determined under a PSAM scheme with minimum mean square error (MMSE) estimation. Adaptive modulation strategies, switching between just BPSK and equiprobable-OOK, may achieve optimal binary signaling for moderate ($\approx 0$ dB) to large SNR. Switching between just BPSK and generalized-OOK is nearly optimal for all SNR.

The design of higher order inputs or optimal inputs when the channel is peak-constrained is not considered herein. Instead, the focus is on the cutoff rate (i) to study the behavior of the optimal binary inputs when only imperfect CSI is available, and (ii) to apply this analysis to the design of a tractable adaptive modulation scheme for PSAM based communications systems.

Figure 2:
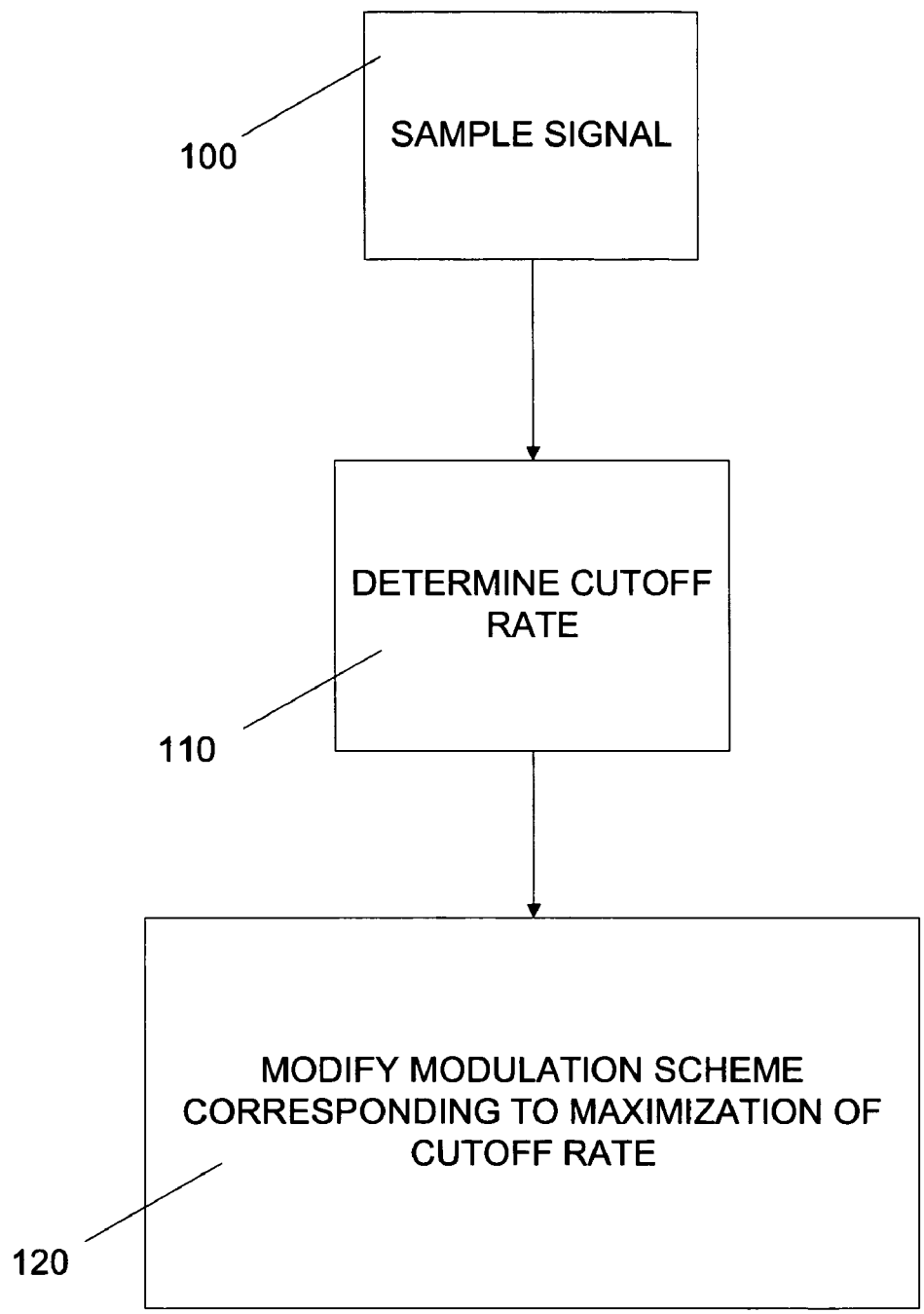
FIG. 2 is a block diagram of an exemplary embodiment of an adaptive modulation algorithm.

Referring now to FIG. 2, a block diagram of an exemplary embodiment of an adaptive modulation communications process is presented. First, in block 100, a transmission is sampled. This sample is used to determine the cutoff rate in block 110. In block 120, modulation scheme is adapted corresponding to the maximization of the cutoff rate determination of block 110. Embodiments of such a communication process include, but are not limited to a wireless radio, a cellular phone, wireless sensor networks, and wireless portable digital assistants.

Figure 3:
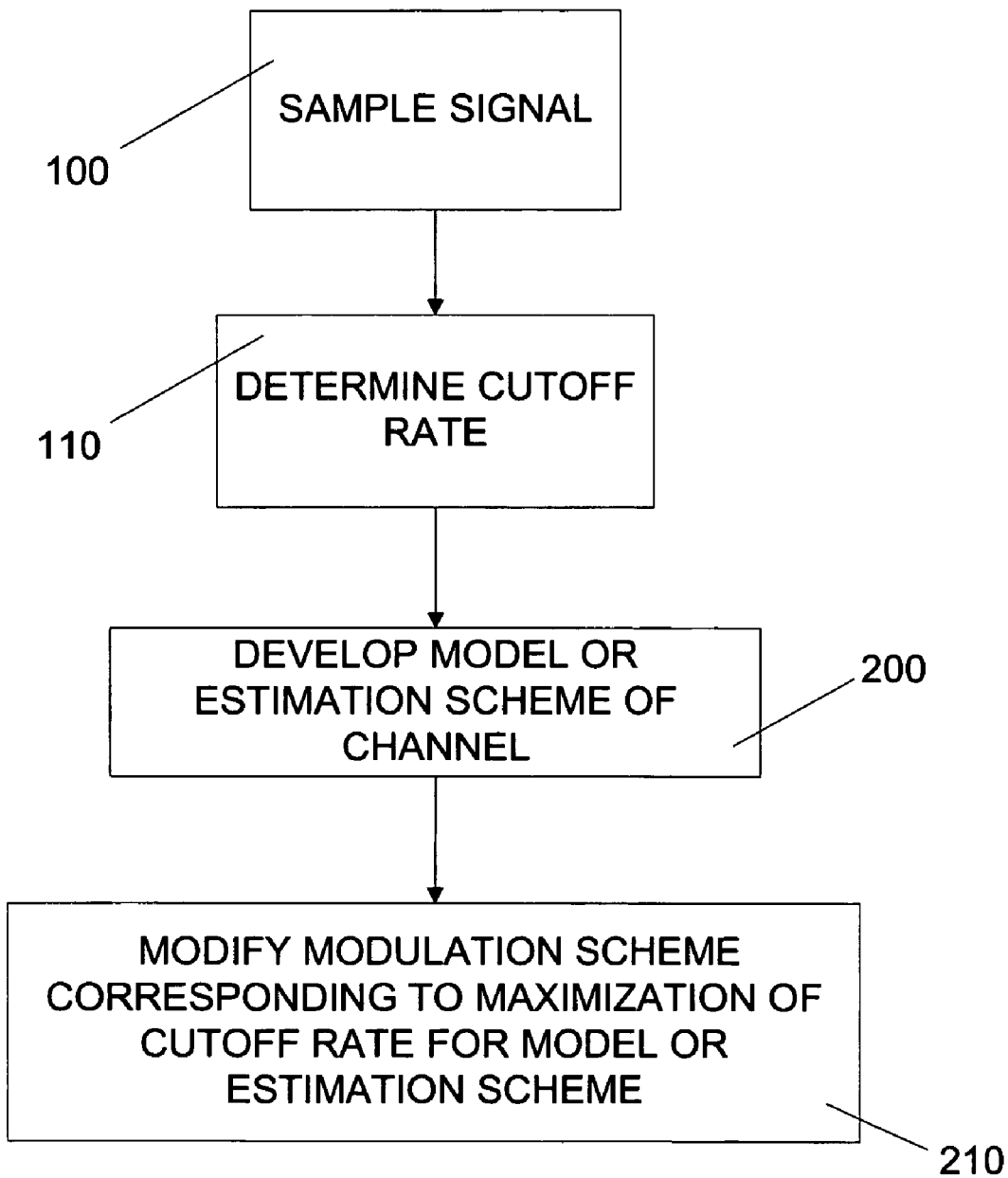
FIG. 3 is a block diagram of an exemplary embodiment of the adaptive modulation algorithm of FIG. 1.
Figure 4:
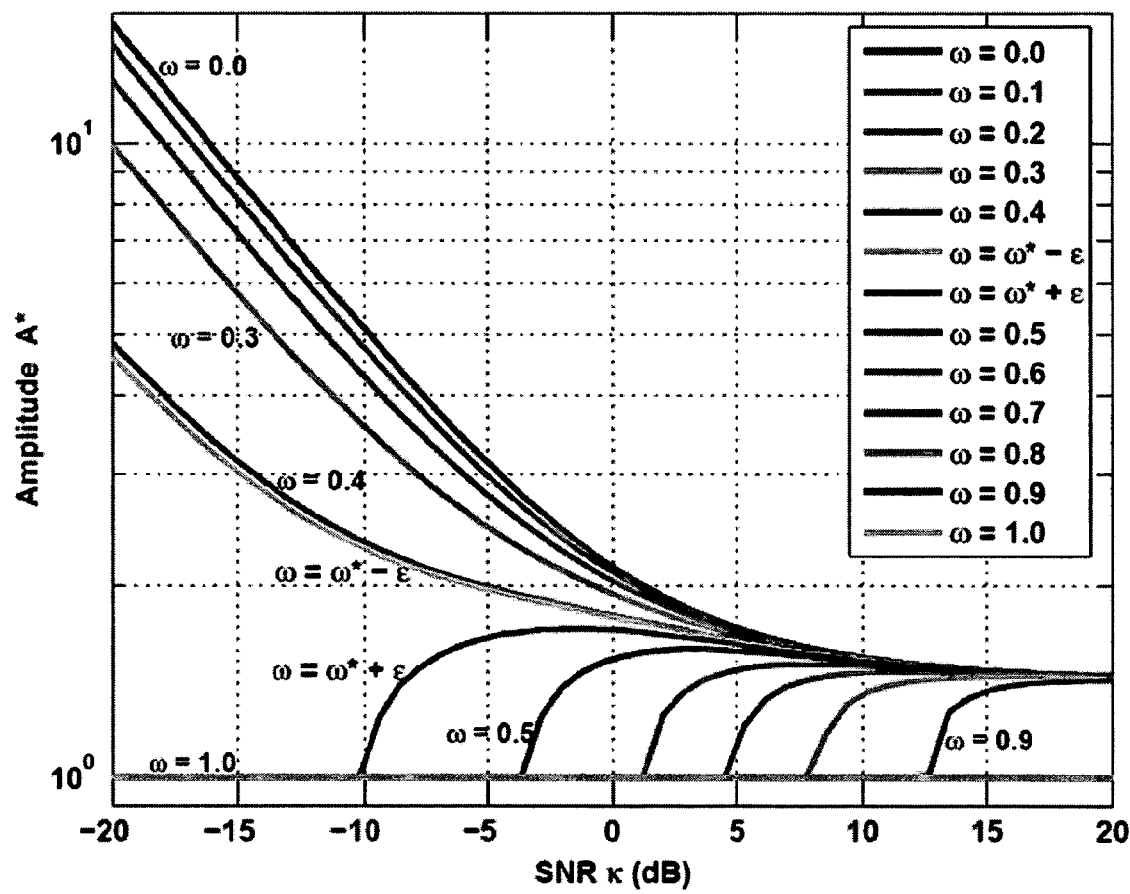
FIG. 4 is a graph of the optimal binary input A* of an exemplary embodiment versus SNR for several values of CSI quality.
Figure 5:
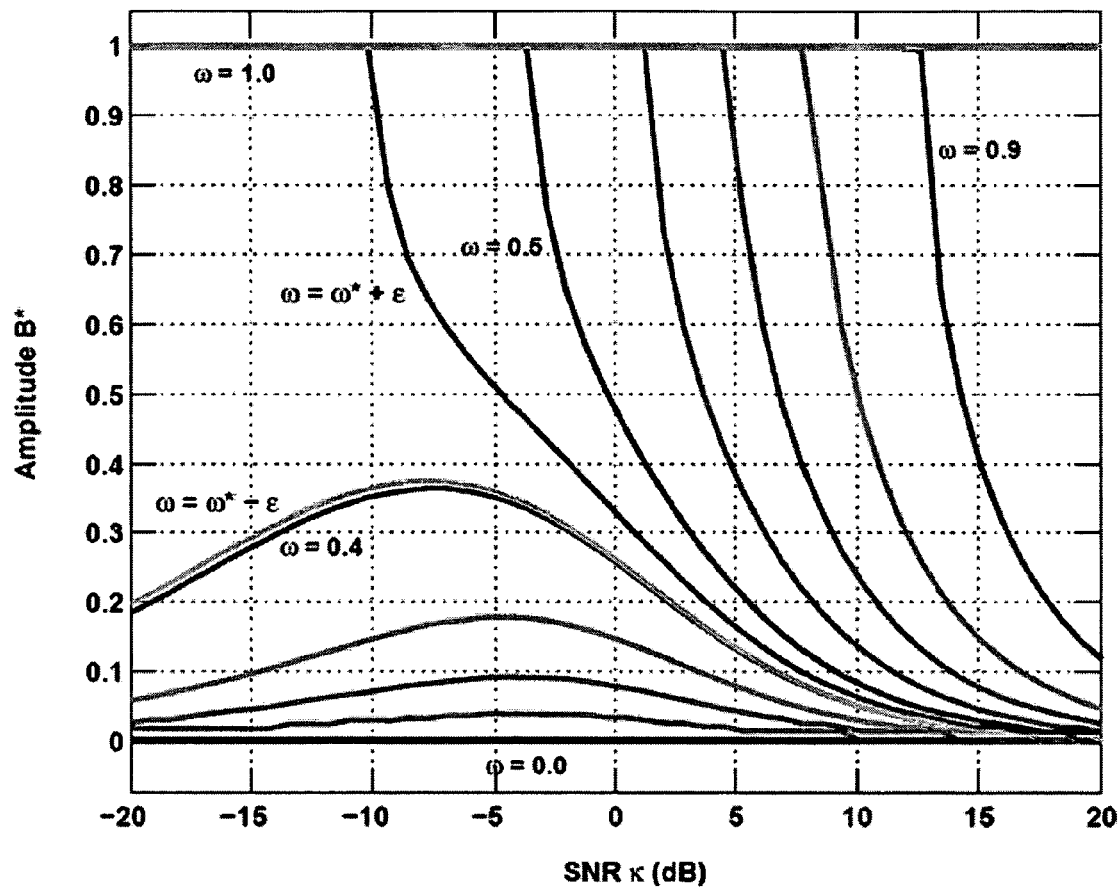
FIG. 5 is a graph of the optimal binary input B* of an exemplary embodiment versus SNR for several values of CSI quality.
Figure 6:
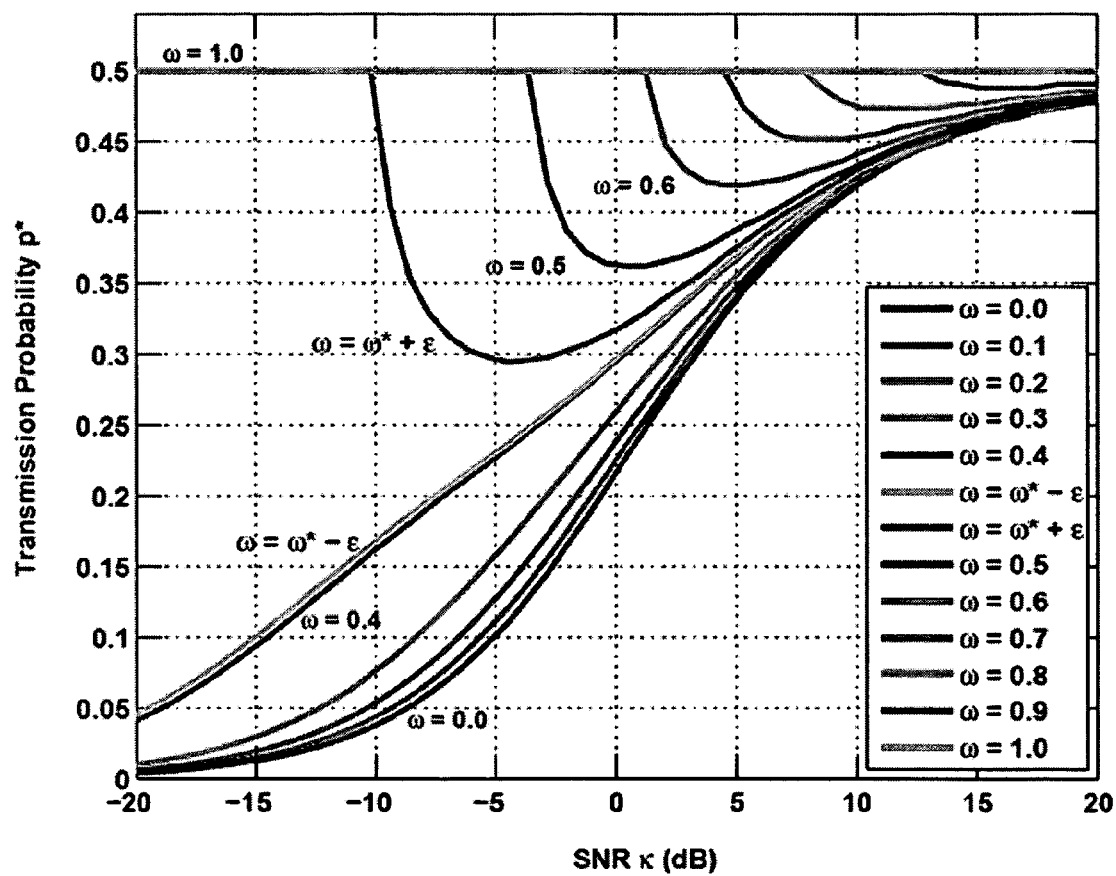
FIG. 6 is a graph of the optimal binary input p* of an exemplary embodiment versus SNR for several values of CSI quality.

FIG. 3 presents a block diagram of another embodiment of an adaptive modulation scheme. First, as in FIG. 2, a transmission signal is sampled 100 and the cutoff rate is determined 110. To adapt the modulation scheme, first, in block 200, a model or estimation of the communication channel is generated. Then, in block 210, the modulation scheme is adapted to maximize the cutoff rate as determined in block 110 for the model or estimation scheme that was generated in block 200. A detailed analysis of each of the steps is provided below.

The following notation and definitions are used herein: $x \approx CN(\mu, \sigma^2)$ denotes a complex Gaussian random variable $\chi$ with mean $\mu$ and with independent real and imaginary parts, each having variance $\sigma^2/2$; $|A|$ is the magnitude of the complex number $A$; $E[.]$ is the expectation operator; and superscript "H" denotes complex conjugation.

In one embodiment, single-user communications are considered over a time-varying Rayleigh flat-fading channel. The received signal $y_k$ may be expressed by $$y_k = \sqrt{E} h_k s_k + n_k \quad (1)$$

were k denotes discrete time, $h_k \approx CN(0, \sigma_h^2)$ models independent and identically distributed (i.i.d.) fading, E is the average symbol energy used at the transmitter, and $n_k = CN(0, \sigma_N^2)$ models additive white Gaussian noise (AWGN). The binary channel input $s_k \in \{A, -B\}$ may be assumed to be real-valued, without loss of generality, and subject to a unit-energy constraint $pA^2 + (1-p)B^2 = 1$, where $0 \leq p \leq 1$ is the probability of transmitting A. Without loss of generality, it may be assumed that $1 \leq A \leq \infty$, and $0 \leq B \leq 1$, $\sigma_N^2 \neq 0$, and $\sigma_h^2 \neq 0$.

During each symbol interval, the receiver obtains imperfect CSI in the form of a channel estimate, $\hat{h}_k$ and so equation (1) can be rewritten as $$y_k = \sqrt{E} \hat{h}_k s_k + \sqrt{E} \tilde{h}_k s_k + n_k$$

where $\tilde{h}_k = h_k - \hat{h}_k$ is the residual error in the channel estimate. Both the estimate and the residual error are assumed to be zero-mean Gaussian and independent, i.e., $\hat{h}_k \approx CN(0, \hat{\sigma}^2)$, $\tilde{h}_k \approx CN(0, \tilde{\sigma}^2)$ and $\hat{\sigma}^2 + \tilde{\sigma}^2 = \sigma_h^2$. MMSE estimation schemes exist that satisfy these assumptions and one such PSAM-based scheme will be discussed later. A receiver may employ a soft decision ML decoder that treats $s_k$ as the channel input and the pair $(y_k, \hat{h}_k)$ as the channel output. That is, letting $s = (s_1, \ldots, s_N)$ denote a transmitted codeword, and $y = (y_1, \ldots, y_N)$ and $\hat{h} = (\hat{h}_1, \ldots, \hat{h}_N)$ denote the observation and channel estimate during the span of a codeword, the decision rule maximizes the posteriori probability of the observation, $$\max_{s \in Q} P(y, \hat{h} | s)$$

where Q is the set of all possible length N input sequences. It is useful to define the CSI quality as the normalized variance of the channel estimate at the receiver, $$w \stackrel{\Delta}{=} \hat{\sigma}^2 / \sigma_h^2$$

Note that w=0 denotes no CSI, while w=1 denotes perfect CSI.

The cutoff rate, measured in bits per channel use may be expressed by, $$R_o = \frac{-\min \log_2}{Q} \int_{y_k} \int_{\hat{h}_k} \left[ \sum_{s_k \in \{A, -B\}} Q(s_k) \sqrt{P(y_k, \hat{h}_k | s_k)} \right]^2 d\hat{h}_k dy_k \quad (2)$$

where $Q(A)=p$, $Q(-B)=1-p$, and where $P(y_k, \hat{h}_k | s_k)$ is the probability distribution function (pdf) of the received signal and channel estimate, conditioned upon the transmitted signal. In deriving the cutoff rate, $$S \stackrel{\Delta}{=} \{A, -B\}$$

and the subscript k is omitted for brevity. Starting from equation (2), results in $$\int_y \int_{\hat{h}} \left[ \sum_{s \in S} Q(s) \sqrt{(P(y, \hat{h} | s))} \right]^2 d\hat{h} dy =$$

-continued $$\sum_{v,w \in S} \sum Q(v)Q(w) E_{\hat{h}} \left[ \int_y \sqrt{P(y|v,\hat{h})P(y|w,\hat{h})} \, dy \right]$$

Note that $y|v,\hat{h} \sim CN(\sqrt{E}\hat{h}v, E\tilde{\sigma}^2 v^2 + \sigma_N^2)$ and similarly for $y|w, \hat{h}$, to result in $$\int_y \sqrt{P(y|v,\hat{h})P(y|w,\hat{h})} \, dy =$$

$$\exp\left\{ -\frac{1}{4} \frac{E|\hat{h}|^2 (v-w)^2}{4E\tilde{\sigma}^2 \left(\frac{v^2+w^2}{2}\right) + \sigma_N^2} \right\} \frac{\sqrt{E\tilde{\sigma}^2 v^2 + \sigma_N^2} \sqrt{E\tilde{\sigma}^2 w^2 + \sigma_N^2}}{E\tilde{\sigma}^2 \left(\frac{v^2+w^2}{2}\right) + \sigma_N^2}$$

Following equation (2), the expectation of the above with respect to $\hat{h} \sim CN(0, \hat{\sigma}^2)$, yields $$\frac{\sqrt{\sigma_N^2 + \tilde{\sigma}^2 E v^2} \sqrt{\sigma_N^2 + \tilde{\sigma}^2 E w^2}}{\sigma_N^2 + \tilde{\sigma}^2 E\left(\frac{v^2+w^2}{2}\right) + \frac{1}{4} \hat{\sigma}^2 E(v-w)^2}$$

Dividing the numerator and denominator by $\sigma_N^2$ and substituting the result into equation (2) yields $$R_o = -\min_{C(p,A,B)} \log_2 \left[ 1 + 2p(1-p), \frac{\sqrt{1+k(1-w)A^2} \sqrt{1+k(1-w)B^2}}{1 + \frac{1}{2}k(1-w)(A^2+B^2) + \frac{1}{4}kw(A+B)^2} - 1 \right] \quad (17)$$

where $C(p, A, B)$ is the constraint set on the input. Simple algebraic manipulation yields $$R_o = -\min_{c(p,A,B)} \log_2 \left[ 1 + 2p(1-p) \left\{ \frac{\sqrt{1+k(1-w)A^2} \sqrt{1+k(1-w)B^2}}{1 + \frac{k}{2}\left(1-\frac{w}{2}\right)(A^2+B^2) + \frac{k_w}{2}AB} - 1 \right\} \right] \quad (3)$$

where $$C(p, A, B) \triangleq$$
$$\{(p, A, B) : 0 \le p \le 1, 1 \le A < \infty, 0 \le B \le 1, pA^2 + (1-p)B^2 = 1\}$$

is the constraint set on the input. The received SNR may then be defined as $$k \triangleq E \frac{\sigma_h^2}{\sigma_N^2}$$

The optimal binary input $(p^*, A^*, B^*)$ as a function of the CSI quality $\omega$ and SNR k is found from equation (3) through the minimization $$\min_{c(p,A,B)} p(1-p) \left\{ \frac{\sqrt{1+k(1-w)A^2} \sqrt{1+k(1-w)B^2}}{1 + \frac{k}{2}\left(1-\frac{w}{2}\right)(A^2+B^2) + \frac{k_w}{2}AB} - 1 \right\} \quad (4)$$

The behavior of this input is shown in FIGS. 4-7 parameterized by w. The transitional CSI quality is defined by $$\overset{*}{w} \triangleq 1 - \frac{1}{\sqrt{3}} \quad (5)$$

Then the behavior of the optimal binary input is characterized by the following statements, R1, R2, R3.

R1. For small SNR (k<<1), if the CSI quality is below the $\overset{*}{w}$threshold ($w < \overset{*}{w}$) then a solution resembling OOK with large amplitude is optimal. As $k \to 0$, $\lim_{p \to 0}$ OOK (p) is optimal (henceforth, OOK(pθ) denotes the binary alphabet with p=pθ, $$A = \frac{1}{\sqrt{p\theta}}$$

and B=0). However, if the CSI quality exceeds the $\overset{*}{w}$threshold ($w > \overset{*}{w}$), the optimal distribution is BPSK, A=B+1, p+½. For low SNR analysis, where k>>1, with w≠1 (if w=1, the solution to equation (4) is easily seen to be BPSK), retaining the first two terms in a Taylor series expansion of equation (4) about k=0, results in $$\max_{C(p,A,B)} J_L \triangleq \qquad (6)$$

$$p(1-p)(A+B)^2 \left[ w + k \left\{ \frac{1}{4}(A-B)^2(3w^2 - 6w + 2) - wAB \right\} \right].$$

If $w < \overset{*}{w}$, consider the case where B=0. The low SNR cost function of equation (6) becomes $$J_L = (1-p)\left[1 + \frac{k}{4}\frac{\phi(w)}{p}\right],$$

where $$\phi(w) \triangleq 3w^2 - 6w + 2,$$

and where the energy constraint is used. The cost function becomes arbitrary large if p→0, with $pA^2=1$, provided $\phi(w) > 0$. Therefore, at low SNR and for $w < \overset{*}{w}$, $\lim_{p \to 0} OOK(p)$ is the optimal input.

If $w > \overset{*}{w}$, it follows that $3w^2 - 6w + 2 < 0$. A consequence is that the optimal A in equation (6) must be finite. If not, $J_L$ will take on an arbitrarily large negative value. Since A is finite and k is small, the k term in equation (6) is omitted. Removing other irrelevant terms results in $$\max_{C(p,A,B)} p(1-p)(A+B)^2. \qquad (7)$$

The solution to equation (7) is any input of the form $$C_{p0} = \left( p_0, \sqrt{\frac{1-p_0}{p_0}}, \sqrt{\frac{p_0}{1-p_0}} \right)$$

where $p_0 \in (0, \frac{1}{2}]$. Next, using $C_{p0}$ as a candidate set of possible solutions, k is increased slightly, to consider the k term and determine which $p_0 \in (0, \frac{1}{2}]$ maximizes equation (18) when $$A = \sqrt{\frac{1-p_0}{p_0}} \text{ and } B = \sqrt{\frac{p_0}{1-p_0}}.$$

Substituting $C_{p0}$ into the above, and removing irrelevant terms (note that $p(1-p(A+B)^2=AB=1$) for solutions in $C_{p0}$), $$\max_{C(p,A,B)} \left( \sqrt{\frac{p}{1-p}} - \sqrt{\frac{1-p}{p}} \right)^2 (3w^2 - 5w + 2)$$

is solved, maximizing for $p_0 = \frac{1}{2}$ (since $3w^2 - 6w + 2 < 0$). Therefore, the optimal input distribution is $$C_{\frac{1}{2}} = \left( \frac{1}{2}, 1, 1 \right),$$

or BPSK.

R2. For large SNR (k>>1), if ($w < \overset{*}{w}$), then from FIG. 4, A* decreases with SNR to the value $\sqrt{2}$. If $w > \overset{*}{w}$, A* remains fixed at 1 before diverging from the BPSK solution with increasing SNR. After divergence, A* increases in SNR, reaches a peak, and then also decreases to the value $\sqrt{2}$. As SNR→∞, OOK ($\frac{1}{2}$) is shown to be optimal for any CSI quality (w≠1). For high SNR Analysis with (k→0): and w≠1, the minimization problem equation (4) becomes $$\min_{C(p,A,B)} J_H \triangleq p(1-p) \left\{ \frac{\sqrt{1-w} A_{\lambda B}(k)}{\frac{\sqrt{k}}{2}\left[\left(1-\frac{w}{2}\right)(A^2+B^2) + wAB\right]} - 1 \right\},$$

where $\lambda_B(k) = \{1, \text{ if } B=0, B\sqrt{k(1-w)}, \text{ if } B \neq 0\}$. Note that $J_H \geq -p(1-p) \geq -\frac{1}{4}$, with equality for $A=\sqrt{2}, B=0$, and $p=\frac{1}{2}$. Therefore, OOK($\frac{1}{2}$) is optimal as k→0.

R3. The optimal transmission probability satisfies $p^* \leq \frac{1}{2}$. A sketch of the proof entails letting $$I_1 \triangleq (p, A_1, B)$$

be an arbitrary triple with $p > \frac{1}{2}$. An alternative solution is $$I_2 \triangleq (1-p, A_2, B), \text{ where } A_2 = \sqrt{\frac{1-pB^2}{1-p}}$$

due to the energy constraint results in a smaller value of equation (4).

Figure 7:
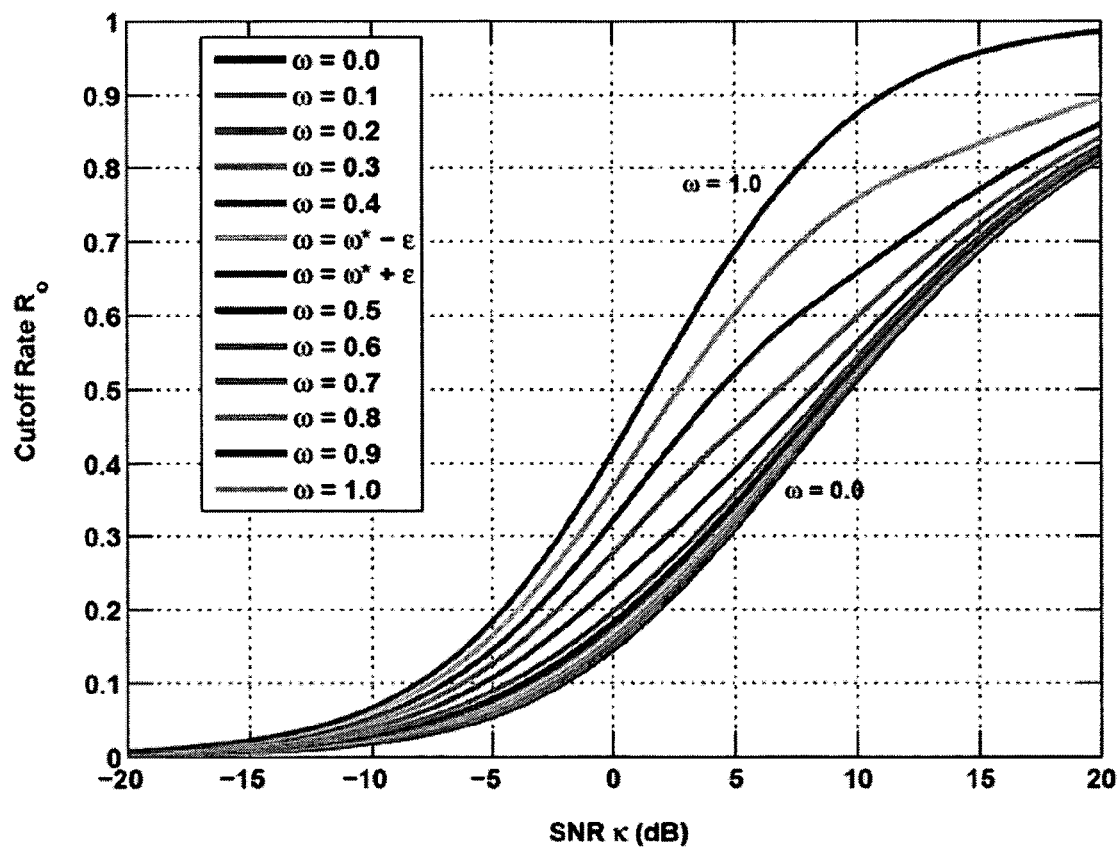
FIG. 7 is a graph of the cutoff rate $R_o$ of an exemplary embodiment versus SNR for several values of CSI quality.
Figure 8:
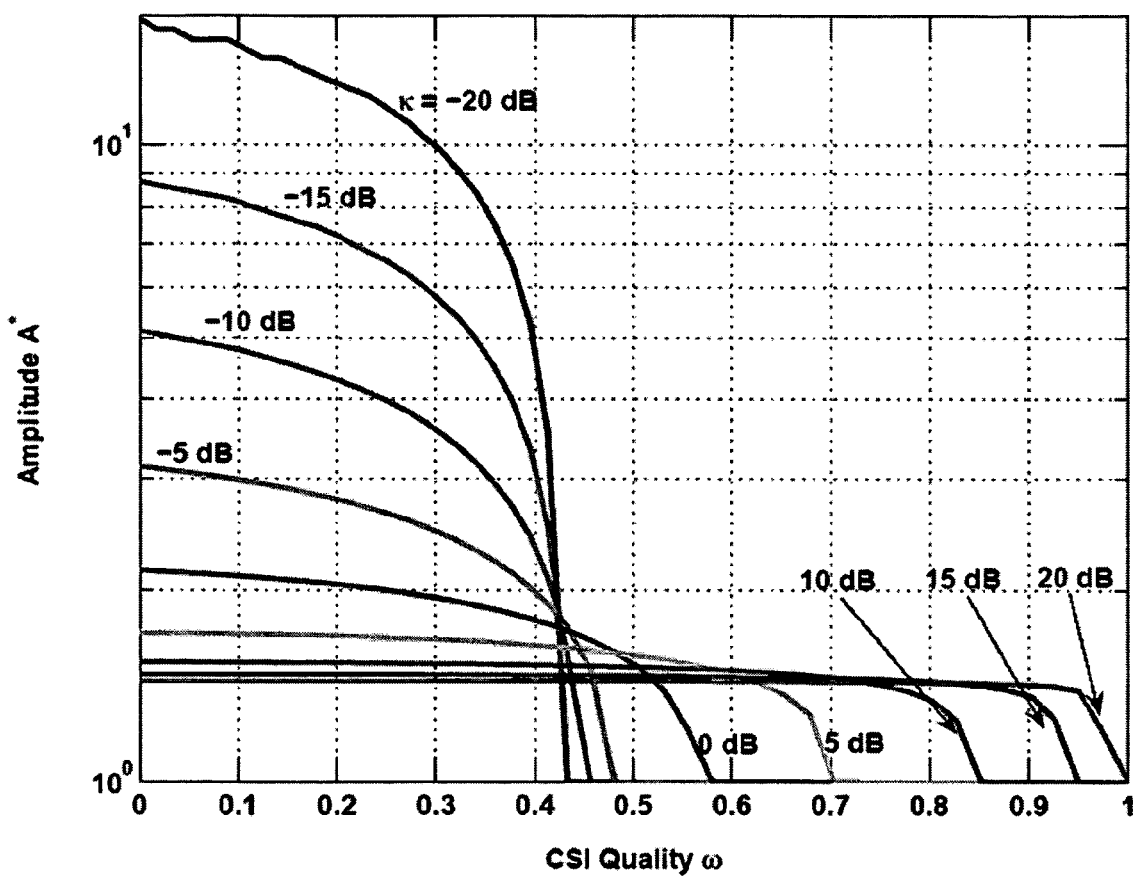
FIG. 8 is a graph of the optimal binary input A* of an exemplary embodiment versus CSI quality for several values of SNR.
Figure 9:
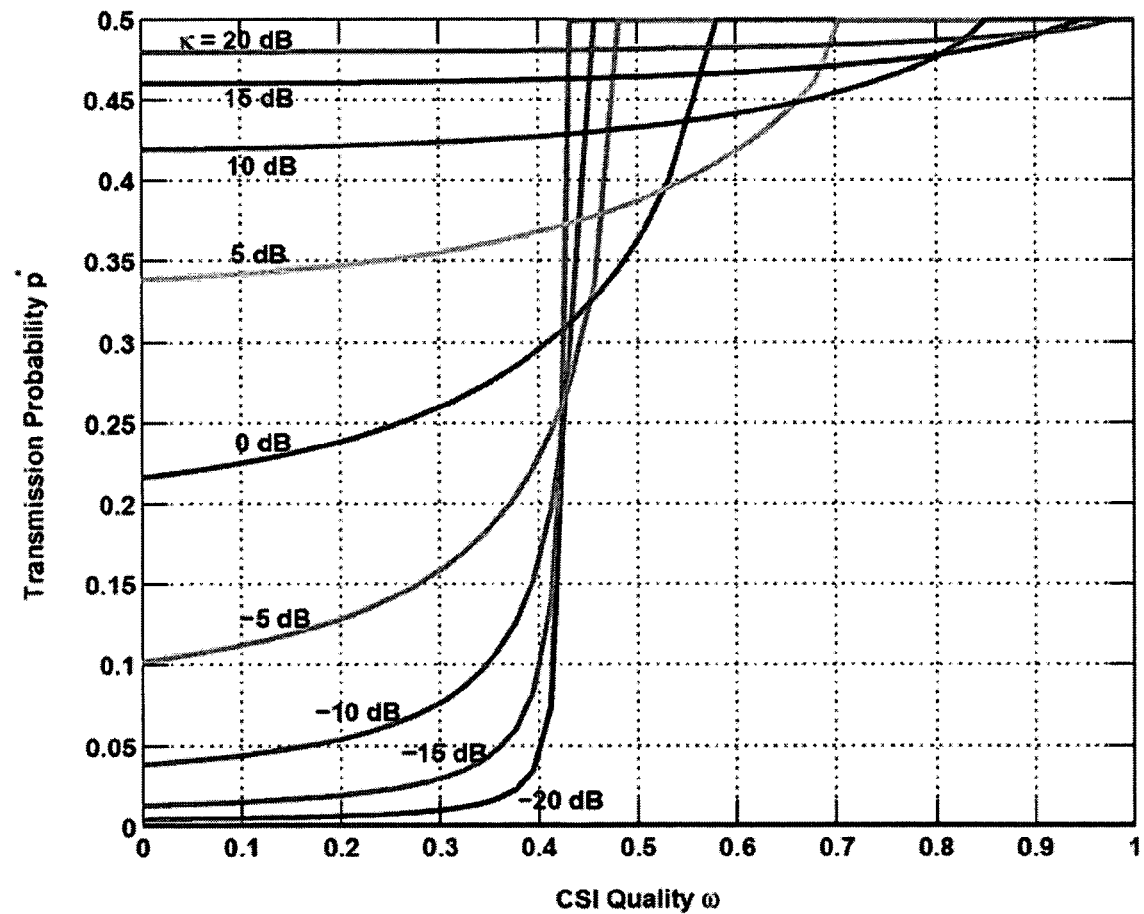
FIG. 9 is a graph of the optimal binary input p* of an exemplary embodiment versus CSI quality for several values of SNR.

However, the cutoff rate can be seen to be well behaved around $w = \overset{*}{w}$ in FIG. 7. In FIG. 8, the optimal input is plotted as parameterized by the SNR k. Again, the presence of the $\overset{*}{w}$ threshold at low SNR is evident. Having examined the general behavior of the optimal binary input, the limiting cases of OOK and BPSK are examined.

The OOK cutoff rate for the fading channel can be derived with imperfect CSI and soft decision ML decoder. Consider first the no CSI case (w=0). OOK(p) modulation maximizes the cutoff rate at all SNR k, and so it remains to determine p*. Setting w=0, we seek to minimize equation (4) with the constraint set C(p, A, B). Let $$p = p_0 \leq \frac{1}{2}$$

be fixed, and let $x=B^2$. Using the energy constraint, the minimization problem becomes $$\min_{0\le x\le 1} f(x) = \min_{0\le x\le 1} \frac{\sqrt{\left(\frac{k+p_0}{p_0}\right) + x\left[\frac{(2p_0-1)k+k^2}{p_0}\right] - x^2 k^2 \frac{1-p_0}{p_0}}}{\left(\frac{p_0+\frac{k}{2}}{p_0}\right) + x\frac{k}{2}\left(\frac{2p_0-1}{p_0}\right)} \quad (8)$$

It can be verified that $\partial f(x)/\partial x \geq 0$ for $x\in[0,1]$ implying that equation (8) is minimized for $x=B^2=0$. Therefore when $w=0$, an On-Off keying solution is optimal. Setting $$A^2 = \frac{1}{p}, B = 0,$$

and $w=0$ in equation (4), p* is given by $$p^* = \quad (9)$$

$$\min_{0<p<\frac{1}{2}} p(1-p)\left[\frac{\sqrt{1+k\frac{1}{p}}}{1+k\frac{1}{2p}} - 1\right] = \left\{p: 0 \le 0 \le p \le \frac{1}{2}, 2(k+1)p^4 + \left(\frac{11k^2}{4} + k - 1\right)p^3 + (k^3 - \underline{3k^2 2} - k)p^2 - k^3 p + \frac{k^3}{4} = 0\right\}$$

Solving equation (9) yields p* explicitly (as the valid root of the fourth-order polynomial), and provides an easy characterization of the optimal transmission probability (equivalently, the optimal signal energy) as a function of the SNR. At low SNR ($k\ll 1$), the transmission probability is linear in SNR, with coefficient $\beta$, i.e., $$p^* = \beta k, \text{ where } \beta \triangleq \frac{(19+3\sqrt{33})^{\frac{2}{3}} - 2(19+3\sqrt{33})^{\frac{1}{3}} + 4}{6(19+3\sqrt{33})^{\frac{1}{3}}} = 0.419 \quad (10)$$

Returning now to the case of partial CSI, equation (3) yields the OOK cutoff rate for arbitrary o as $$R_{O,K} = -\min_{0<p<1} \log_2\left\{1 + 2p(1-p)\left[\frac{\sqrt{1+k(1-w)\frac{1}{p}}}{1+k(2-w)\frac{1}{4p}} - 1\right]\right\}. \quad (11)$$

Figure 10:
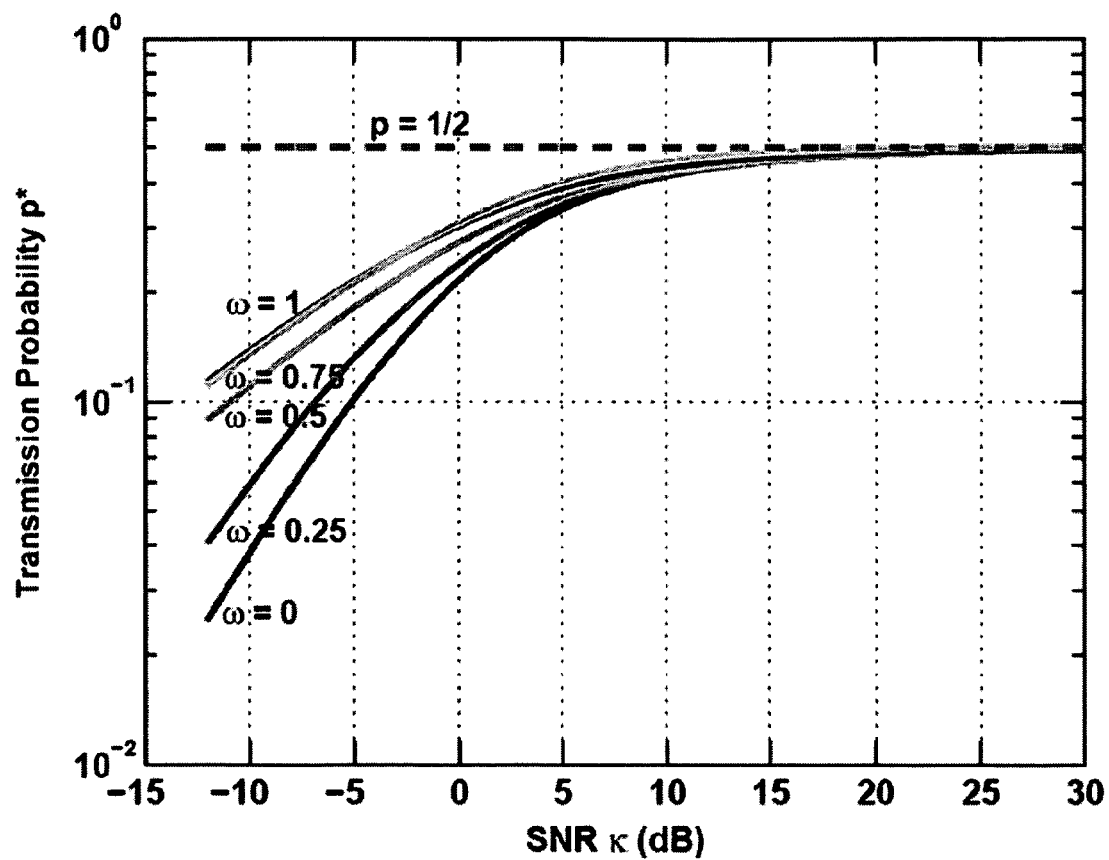
FIG. 10 is a graph of the optimal OOK probability p* of an exemplary embodiment versus SNR.
Figure 11:
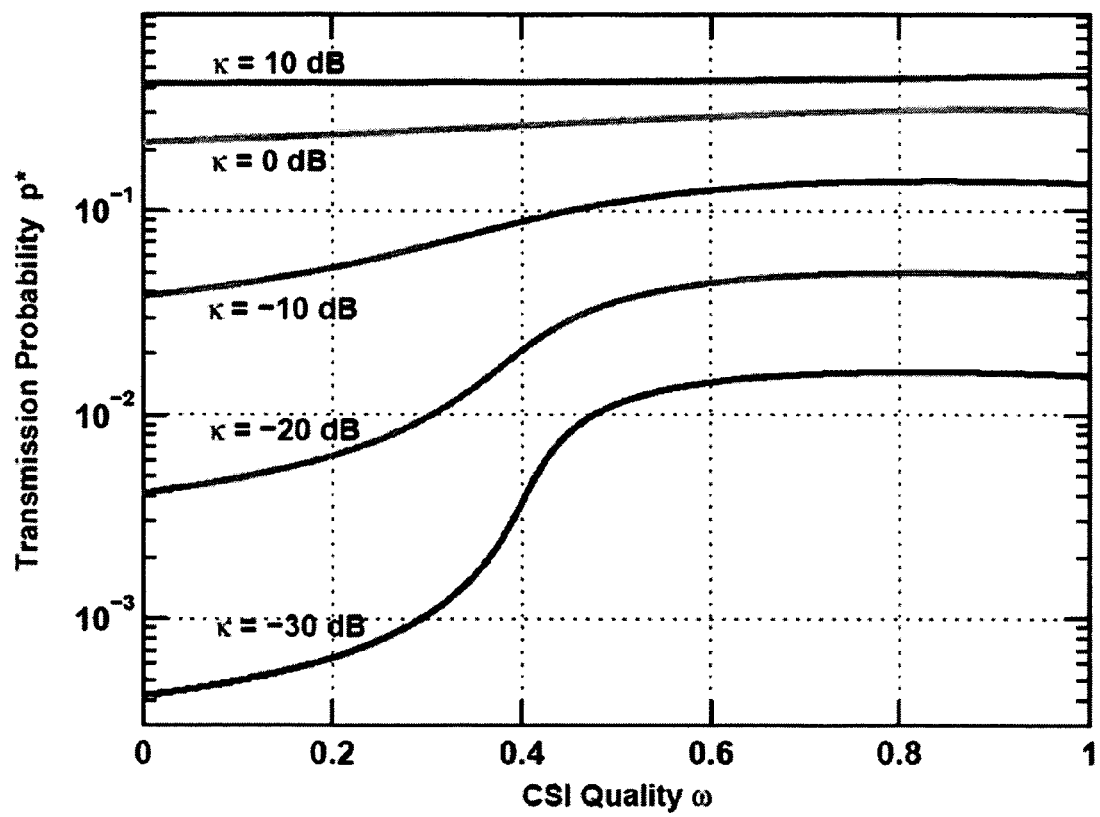
FIG. 11 is a graph of the optimal OOK probability p* of an exemplary embodiment versus CSI quality.

Analytic maximization of equation (11) over p leads to a high-order polynomial that does not have an explicit solution as a function of k and w. p* is plotted as a function of k in FIG. 10 and as a function of w in FIG. 11. It can be verified that as $k\to\infty$, $p^*\to\frac{1}{2}$, and that as $k\to 0$, $p^*\to 0$. The transmission probability p* is seen to be non-monotonic in w at low SNR. A second-order Taylor series expansion of the expression within the outside brackets in equation (11) at $k=0$, yields ($w\neq 0$)

$$p^* = \arg\min_{0<p<1} -\frac{k(1-p)[4pw + k(3w^2 - 6w + 2)]}{16p},$$

which results in $$p^* = \frac{\sqrt{k}}{2}\sqrt{\frac{-2+6w-3w^2}{w}} \text{ for } w > \overset{*}{w} \quad (12)$$

which is decreasing for $$w \in \left(\sqrt{\frac{2}{3}}, 1\right].$$

As k increases, the amplitude A* decreases $$\left(\text{since } A^2 = \frac{1}{p}\right).$$

From FIG. 10, for fixed k, the amplitude A* is a decreasing function of w. For moderate to large values of k, letting $p=\frac{1}{2}$ is a reasonable approximation to p*. Using $p=\frac{1}{2}$, the equiprobable-OOK cutoff rate is found to be $$R_{O,K} = -\log_2\left\{\frac{1}{2} + \frac{1}{2}\left[\frac{\sqrt{1+2k(1-w)}}{1+k\left(1-\frac{w}{2}\right)}\right]\right\}. \quad (13)$$

Figure 12:
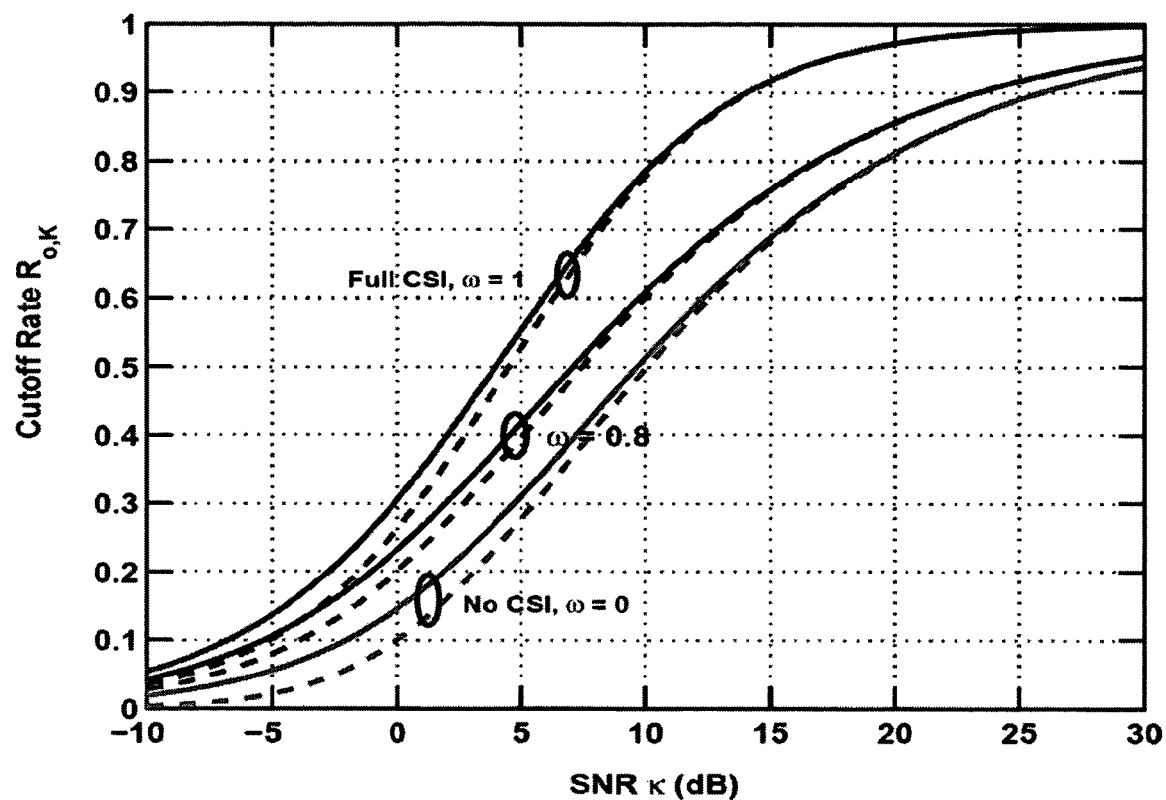
FIG. 12 is a graph of the OOK cutoff rate of an exemplary embodiment versus SNR for no CSI, perfect CSI, and imperfect CSI.

In FIG. 12, $R_{O,K}$ is plotted for $p=p^*$ and $p=\frac{1}{2}$ for no CSI ($w=0$), perfect CSI ($w=1$), and imperfect CSI ($w=0.8$). Note that the cutoff rate of both $$OOK\left(\frac{1}{2}\right)$$

and OOK (p*) approaches 1 at high SNR for any w.

Next, the case of perfect CSI is considered. Let $w=1$ in equation (4), which leads readily to the BPSK solution, $A=B$, and $p=\frac{1}{2}$. For arbitrary w, the cutoff rate of BPSK is $$R_{O,B} = -\log_2\left\{\frac{1}{2} + \frac{1}{2}\left[\frac{1+k(1-w)}{1+k}\right]\right\}. \quad (14)$$

Figure 13:
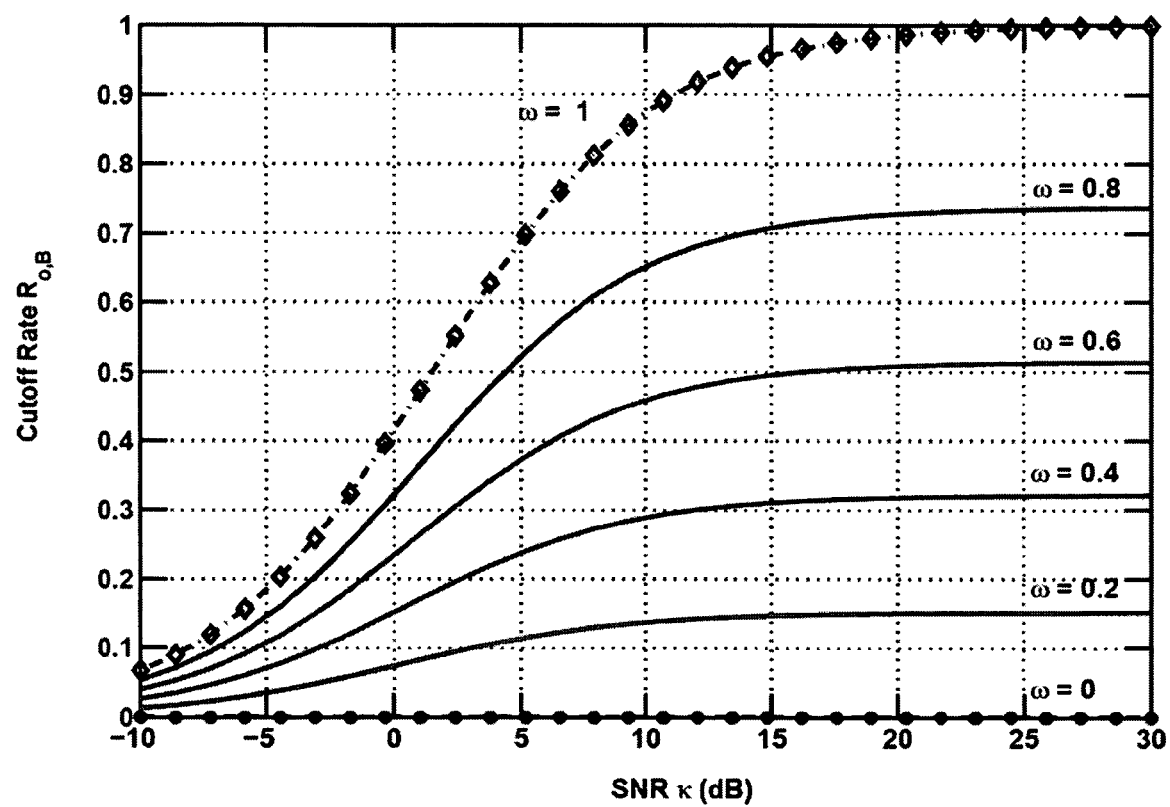
FIG. 13 is a graph of the BPSK cutoff rate of an exemplary embodiment versus SNR for different values of CSI quality.

FIG. 13 shows the cutoff rate as a function of the received SNR k and the CSI quality w. The CSI quality imposes an asymptotic ceiling on $R_{O,B}$, and at high SNR, the cutoff rate saturates to $$R_{O,B} = -\log_2\left\{1 - \frac{w}{2}\right\}.$$

As expected, the cutoff rate is substantially zero when there is no CSI.

To study the relative impact of imperfect CSI on BPSK and OOK, it is instructive to consider the statistics of $y_k$ under the two hypotheses:

$$y_k|\hat{h}_k, s_k \sim CN(\sqrt{E}\hat{h}_k s_k, \sigma_N^2(1+s_k^2 k(1-w)))$$

where $s_k \in \{-1,1\}$ for BPSK and $s_k \in \{0, \sqrt{2}\}$ for OOK (½). When the SNR is large enough, i.e., $$k \gg \frac{1}{1-w},$$

the channel estimation error dominates, and the BPSK performance saturates. Thus, OOK is optimal at large k, and BPSK is optimal for small k. Next, the SNR at which one should switch from BPSK to OOK is quantified as a function of estimator quality w.

BPSK (optimal for perfect CSI) and OOK (optimal for no CSI) have been examined to provide the transitional SNR $\overset{*}{k}$, above which OOK is optimal, and below which BPSK is optimal. This result provides an initial characterization of the intermediate region where imperfect CSI is available, and provides an analytic basis for an adaptive modulation scheme in which the transmitter can select between OOK and BPSK based on the SNR k and CSI quality w available at the receiver. For OOK (½), the transitional SNR k is found by equation (14) and equation (13) and solving for k. Doing so yields the solution $$\overset{*}{k}(w) = \left\{k : \frac{(2-w)^2(1-w)^2}{4}k^3 \frac{(1-w)}{2}[(10-3w)w-4]k^2 + \left(\frac{13w^2}{4} - 5w + 1\right)k - w = 0, 0 \le k \le 1\right\}$$

for which the explicit solution is $$\overset{*}{k}(w) = \frac{(a+b)^{\frac{1}{3}} + (a-b)^{\frac{1}{3}} - 2(4-10w+3w^2)}{3(2-w)^2(1-w)} \quad (15)$$

with the definitions $$a \triangleq 81w^6 - 468w^5 + 828w^4 - 640w^3 + 624w^2 - 192w + 64,$$

$$b \triangleq 6\sqrt{3}\,(w-2)^2 w^2 \sqrt{61w^4 - 208w^3 + 168w^2 - 64w + 16}.$$

Figure 14:
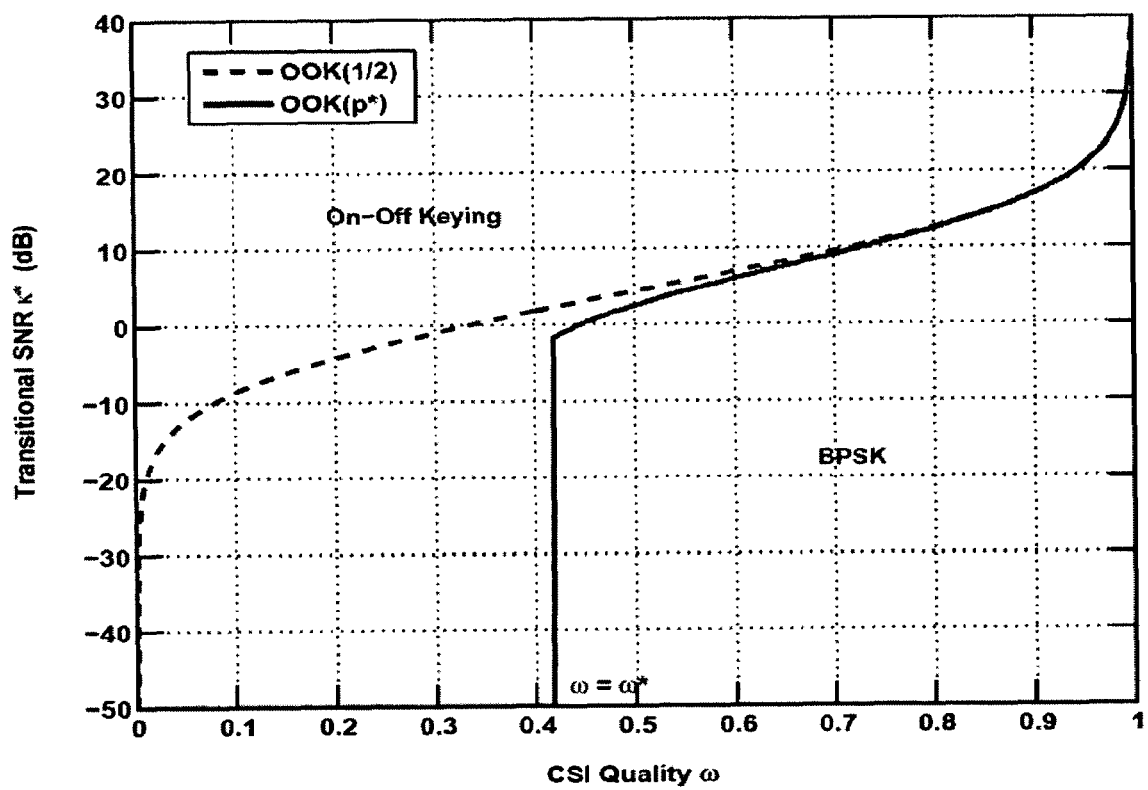
FIG. 14 is a graph of the transitional SNR of an exemplary embodiment above which OOK is optimal and below which BPSK is optimal.

The transitional SNR $\overset{*}{k}$ depends on the CSI quality, and is shown in FIG. 14. At the end points, $w=\{0,1\}$: $\overset{*}{k}(0)=0$, implying that equiprobable-OOK is preferred to BPSK at any SNR when no CSI is available, and $\lim_{w\to 1} \overset{*}{k}(w)=\infty$, implying that BPSK is preferred to equiprobable-OOK when perfect CSI is available.

In FIG. 14, the threshold curve for OOK(p*) is presented. To find this region, equation (14) is equated to equation (11) and $\overset{*}{k}$ is solved for numerically. As expected, optimizing over p results in OOK(p) being preferred to BPSK over a wider range of SNR for fixed w. Interestingly, there is a threshold value of CSI below which BPSK is not useful. A low SNR analysis once again reveals this value to be $$\overset{*}{w} = 1 - \frac{1}{\sqrt{3}}.$$

Figure 15:
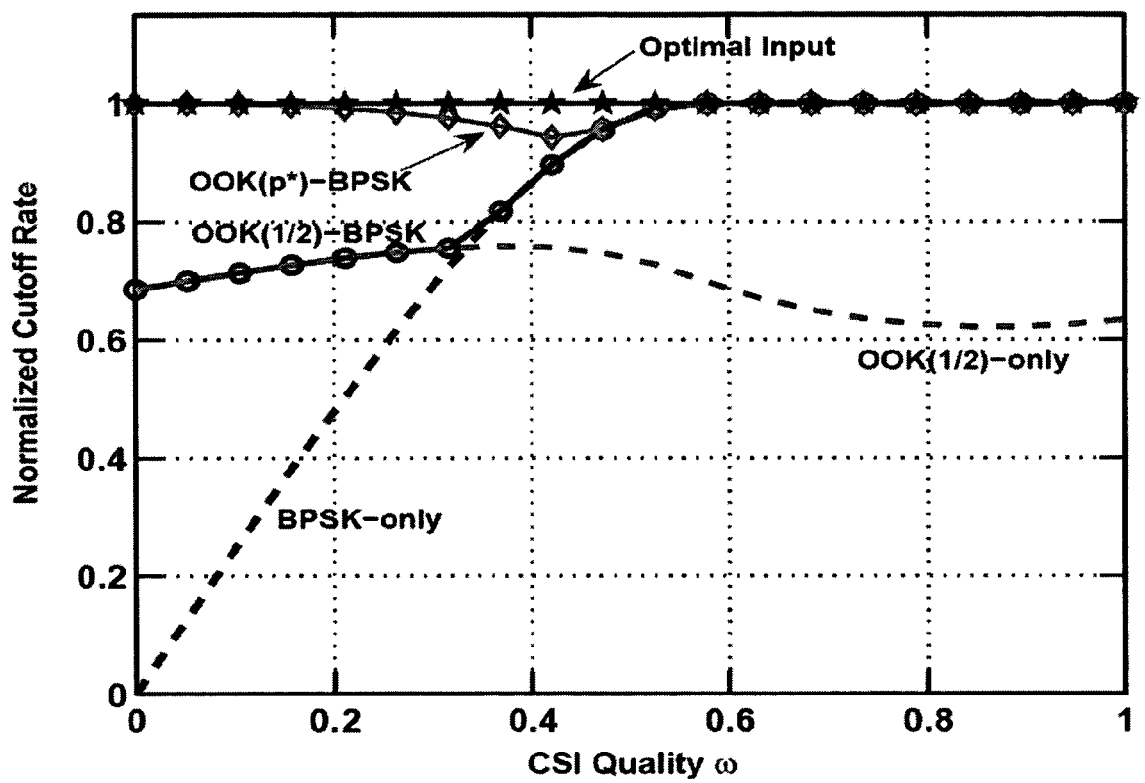
FIG. 15 is a graph of the normalized cutoff rate of an exemplary embodiment of the Rayleigh flat-fading channel with imperfect CSI as a function of the CSI quality.

The performance of the adaptive modulation schemes is shown in FIG. 15. As upper and lower bounds, the cutoff rate of optimal binary signaling is plotted $$\left(\frac{1}{2}\right)-$$

(determined from equation (4)), and for the BPSK-only and OOK only schemes when k=0 dB. Each curve has been normalized by the cutoff rate of optimal binary signaling. The OOK $$\left(\frac{1}{2}\right)-$$

Figure 16:
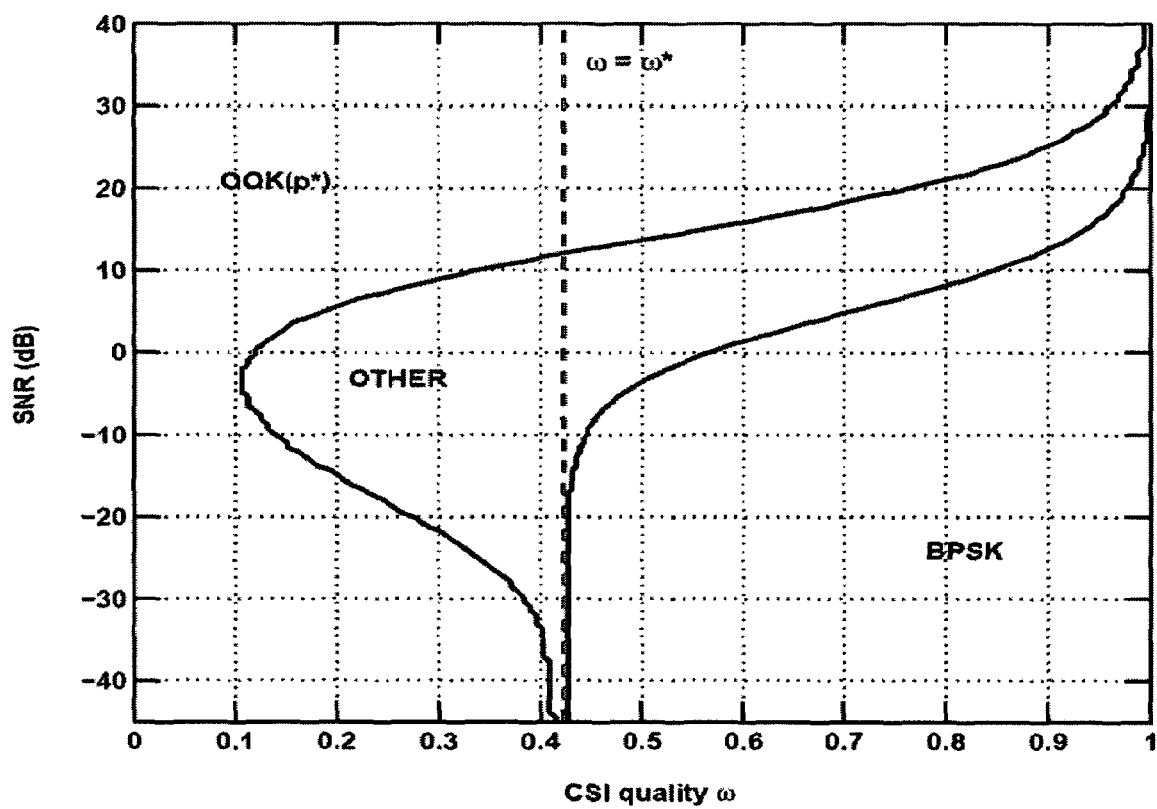
FIG. 16 is a graph of partitioning of the (SNR,CSI) plane of an exemplary embodiment into three regions.

BPSK scheme simply traces out the best of the BPSK and OOK cutoff rates. The BPSK-only scheme performs arbitrarily poorly for small w (as expected due to its saturating behavior at large SNR, see FIG. 13), while the OOK $$\left(\frac{1}{2}\right)-$$

only scheme is seen to be suboptimal by up to ~40 percent for large values of w. In contrast, the OOK(p*)-BPSK scheme performs nearly as well as optimal binary signaling over the entire range of w. To understand this behavior, the (k,w) plane is partitioned into three regions in FIG. 16: (a) the region where BPSK is within one-percent of optimal, (b) the region where OOK (p*) is within one-percent of optimal, and (c) the remaining region. Over most of the (k,w) plane, either BPSK or OOK(p*) is indeed nearly optimal. Comparing FIG. 16 to FIG. 14, BPSK retains nearly its entire optimality region even when arbitrary binary inputs are admitted. In contrast, OOK (p*) loses a portion of its optimality region in this scenario. In particular, the region loosely described by $\{(k,w): -20\text{ dB} \le k \le 10\text{ dB}, 0.2 \le w \le \overset{*}{w}\}$ is now allocated to region (c).

The sensitivity of the cutoff rate to the binary input used for four limiting cases entails: (a) large k(k=30 dB), large w(w=0.95) (b) small k(k=−10 dB), large w, (c) large k, small w(w=0.1), and (d) small k, small w.

For large w and for large k, the cutoff rate is sensitive to the choice of p, but not to the choice of B. For example, with B=1, the cutoff rate increases more than 300 percent as p increases from 0.1 to 0.5. On the other hand, with p=0.4, the cutoff rate increases by only 4 percent as B varies from 0 to 1. For large w and small k, the cutoff rate is sensitive to choice of both p and B. For example, with B=1, the cutoff rate increases by 280 percent as p increases from 0.1 to 0.5. With p=0.5, the cutoff rate increases by a factor of approximately 200 percent as B varies from 0 to 1.

For small w and both small and large k, the cutoff rate is sensitive to the choice of B when p is chosen optimally. When p is chosen suboptimally, sensitivity decreases. For example, at small k the cutoff rate increases by 400 as B increases from 0 to 1. At large k, the increase is 800 percent. In each case, sensitivity to B diminishes if p is chosen suboptimally. Overall, it is clear that optimization can provide large gains in the cutoff rate.

In an exemplary embodiment, a temporally correlated flat-fading channel is considered and the results of the analysis provided above are applied to the design of an adaptive modulation scheme for PSAM-based communications. In another exemplary embodiment, using PSAM-based communications, known pilot symbols are multiplexed with data symbols for transmission through the communications channel. At the receiver, knowledge of these pilots is used to form channel estimates, which aid the detection of the data both directly (by modifying the detection rule based on the channel estimate) and indirectly (e.g., by allowing for estimate-directed modulation, power control, and media access). In general, there is no guarantee that PSAM-based approaches are optimal, and PSAM has been shown to be suboptimal when the channel coherence time is small and/or the SNR is small from various perspectives. Nevertheless, the technique is of great practical significance. In addition to providing implementable receiver structures, PSAM facilitates accurate timing and synchronization. PSAM has been incorporated into many commercial and Military standards, and optimized approaches to PSAM have been studied from the perspectives of frequency and timing offset estimation, bit-error rate (BER), and the channel capacity or its bounds.

In an exemplary embodiment, a generalized Rayleigh fading channel according to equation (1) includes temporal correlation. The observation equation is $$y_k = \sqrt{E} h_k s_k + n_k,$$

where $h_k = CN(0, \sigma_h^2)$ now exhibits temporal correlation described by the normalized correlation function $$R_h(\tau) \triangleq \frac{1}{\sigma_h^2} E[h_k h_{k+\tau}^H].$$

In an exemplary embodiment, training is sent with period T at times k=mT, m∈Z and that $s_{mT}$=+1. In each data slot mT+l (1≤l≤T−1), an MMSE estimate of the channel $\hat{h}_{mT+l}$ is made at the receiver using some subset N of past and future training symbol observations, so that $$\hat{h}_{mT+l} = E[h_{mT+l} | \{y_{nT}\}_{n \in N \subseteq Z}], \ 1 \le l \le T-1, \ m \in Z \quad (16)$$

The system equation in the mth frame i.e., mT≤k≤(m+1)T−1, is then $$y_k = \begin{cases} \sqrt{E} h_{mT} + n_{mT} & \text{(pilot symbol),} \\ \sqrt{E} (\hat{h}_{mT+l} + \tilde{h}_{mT+l}) s_{mT+l} + n_{mT+l} & \text{(data symbols).} \end{cases} \quad (17)$$

The use of an MMSE estimator implies that the estimate $\hat{h}_{mT+l}$ and the estimation error $\tilde{h}_{mT+l}$ are zero-mean, jointly Gaussian, and independent with variances $\hat{\sigma}_l^2$ and $\sigma_h^2 - \hat{\sigma}_l^2$ respectively; $\hat{h}_{mT+l} \approx CN(0, \hat{\sigma}_l^2)$ and $\tilde{h}_{mT+l} \approx CN(0, \sigma_h^2 - \hat{\sigma}_l^2)$. To characterize the partial CSI provided by the estimator l slots from the last-pilot, the CSI quality may be defined in the $l^{th}$ slot $$w_l \triangleq \frac{\hat{\sigma}_l^2}{\sigma_h^2}, \ 1 \le l \le T-1. \quad (18)$$

The CSI quality $w_l$, 0≤$w_l$≤1, captures the impact of the channel correlation $R_h(\tau)$, estimator N, and SNR k on the statistical quality of channel estimates at the receiver. The variance of any estimator can be found by noting that $\hat{h}_{mT+l}$ is the expected value of one Gaussian vector conditional upon another. The CSI quality may then be readily obtained via equation (18).

Given the periodic nature of the training, it is natural to let the binary signaling scheme vary from data slot to data slot, with period T. Therefore, defining $$[k] \triangleq k$$

mod T, $s_k$ may be to be selected from a real-valued binary signal set $S_{[k]} = \{A_{[k]}, -B_{[k]}\}$ subject to a unit average-energy constraint:

$P_{[k]} A_{[k]} + (1 - p_{[k]}) B_{[k]}^2 = 1$, where $p_{[k]}$ is the probability of transmitting $A_{[k]}$ (note that $S_0 = \{+1\}$). $A_{[k]}$ and $B_{[k]}$ may be real-valued, and with $1 \le A_{[k]} \le \infty$ and $0 \le B_{[k]} \le 1$. Finally, codewords can occur in integers multiples of a frame length, i.e., N=n(T−1), n=1, 2, ..., and are decoded using the ML decoder which treats $s_1, \ldots s_{T-1}$ as the channel input and the pair $(\hat{h}_1, \ldots, \hat{h}_{T-1}; y_1, \ldots, y_{T-1})$ as the channel output.

In one embodiment, a system is implemented in which perfect interleaving is performed at the transmitter and channel estimation is performed before deinterleaving at the receiver. The system equation under interleaving is still given by equation (17), but now $h_k \approx CN(0, \sigma_h^2)$ and $n_k \approx CN(0, \sigma_N^2)$ are i.i.d. sequences representing the interleaved channel and noise. Interleaving implies that $\hat{h}_k$ and $\tilde{h}_k$ are independent sequences in k and are independent with respect to each other. However, the marginal statistics of the channel estimate and estimation error are preserved, i.e., $\hat{h}_{mT+l} \approx CN(0, \sigma_h^2)$ and $\tilde{h}_{mT+l} \approx CN(0, \sigma_h^2 - \hat{\sigma}_l^2)$.

In one exemplary embodiment, the cutoff rate of a PSAM communications system with generalized binary inputs can be modeled by $$R_O = -\frac{1}{T}\sum_{l=1}^{T-1} \min_{C_l(p, A, B)} \log_2\left[1 + 2p_l(1-p_l)\left\{\frac{\sqrt{1+k(1-w_l)A_l^2}\sqrt{1+k(1-w_l)B_l^2}}{1+\frac{k}{2}\left(1-\frac{w_l}{2}\right)(A_l^2+B_l^2)+\frac{k w_l}{2}A_l B_l} - 1\right\}\right], \quad (19)$$

where $$C_l(p, A, B) \triangleq \{(p_l, A_l, B_l,) : 0 \leq p_l \leq 1, 1 \leq A_l < \infty, 0 \leq B_l \leq 1, p_l A_l^2 + (1-p_l)B_l^2 = 1\}$$

is the constraint set on the $l^{th}$ input.

Comparing the cutoff rate of the i.i.d. channel expressed in equation (3) to that of a PSAM system operating over the temporally correlated facing channel under interleaving expressed in equation (19), it is clear that the latter can be interpreted as consisting of T–1 parallel data-channels, where the $l^{th}$ channel consists of all data slots occurring l positions after the most recent pilot. The $l^{th}$ ($1 \leq t \leq T-1$) term in the sum of equation (19) represents the cutoff rate in one of T–1 data channels, with CSI quality $w_l$ and SNR k. Therefore, letting $w = w_l$, we can apply the previous analysis on a per-channel basis. This motivates design of a PSAM system in which the optimal binary distribution ($A_l^*$, $B_l^*$, $p_l^*$) is used in each data channel. Next, the cutoff rate of equation (19) is combined with the earlier optimal input analysis to design adaptive modulation schemes in which the transmitter selects the modulation in each data slot based on the partial CSI $w_l$ and SNR k at the receiver.

Adaptive transmission techniques for fading channels have been well studied. Typically, a subset of the key transmission parameters—power, rate, modulation shape and size, and bandwidth—is adapted based on some instantaneous measure of the channel quality, which may be determined by the fading, noise, or interference level at the receiver. This knowledge is typically provided to the transmitter via a feedback link, which introduces its own noise and/or delay to the process. However, when PSAM is employed over continuously time-varying fading channels, the transmitter need not adapt to instantaneous channel quality measurements, since it can adapt instead to the statistical quality of the channel estimates—which varies with the estimate's position relative to pilot symbols. Further, if the transmitter has knowledge of the channel Doppler spectra, $R_h(\tau)$, it can compute this statistical quality without requiring explicit feedback.

In an exemplary embodiment, an adaptive binary modulation scheme is developed based on the cutoff rate. The goal is to compare the performance of the simple two-distribution modulation techniques derived earlier to optimal binary signaling. Specifically, the following exemplary embodiments have resulted:

C1. An OOK $$\left(\frac{1}{2}\right)-$$

BPSK adaptive system in which equiprobable-OOK is used in each sub-channel where it is preferred to BPSK, and where BPSK is used otherwise. In this embodiment, the cutoff rate of this system is $R_{HYB1}$. This scheme is implemented through the analytic switching rule derived in equation (15).

C2. An OOK(p*)-BPSK adaptive system in which generalized-OOK is used in each sub-channel where it is preferred to BPSK, and where BPSK is used otherwise. In this embodiment, this cutoff rate is $R_{HYB2}$. This scheme is implemented using the solid curve shown in FIG. 14. In practice, this curve can be implemented in hardware at low cost.

C3. A preferred embodiment is optimal binary signaling, in which each data slot is assigned the cutoff rate optimal binary input as determined from equation (4). This may be computed numerically. The cutoff rate of this system is $R_{BIN}$. This scheme provides an upper bound on the performance of C1 and C2.

A comparative system is the BPSK-only system. The cutoff rate of this system is $R_{BPSK}$. This scheme provides a lower bound on the performance of C1 and C2.

Yet another comparative system is the OOK $$\left(\frac{1}{2}\right)-$$

only system which uses OOK $$\left(\frac{1}{2}\right)$$

in each sub-channel. The cutoff rate of this system is $R_{OOK}$. This scheme also provides a lower bound on the performance of C1 and C2.

The adaptive modulation scheme, based on switching between just two inputs, captures the optimality of scheme C3 over a wide range of SNR, while requiring a fraction of the complexity. This switching may be oscillatory, e.g., producing a BPSK-OOK-BPSK or OOK-BPSK-OOK behavior, if $w_l$ is non-monotonic in l. This may be the case is the channel correlation $R_h(\tau)$ is non-monotonic and/or a non-causal estimator is used.

The system may be simulated for performance analysis using two estimators. The causal (1,0) estimator N={m}, for which $$w_l^{(1,0)} = R_h^2(l)\frac{k}{1+k},$$

and the non-causal (1,1) estimator N={m, m+1} for which $$\left(\Gamma_{(k)} \triangleq \frac{(K+1)R_h(k) - KR_h(T)R_h(T-k)}{(K+1)^2 - K^2 R_h^2(T)}\right)$$

$$w_l^{(1,1)} = (K^2+K)(\Gamma_{(l)}^2 + \Gamma_{(T-l)}^2) + 2K^2 R_h(T)\Gamma_{(l)}\Gamma_{(T-l)}$$

Figure 17:
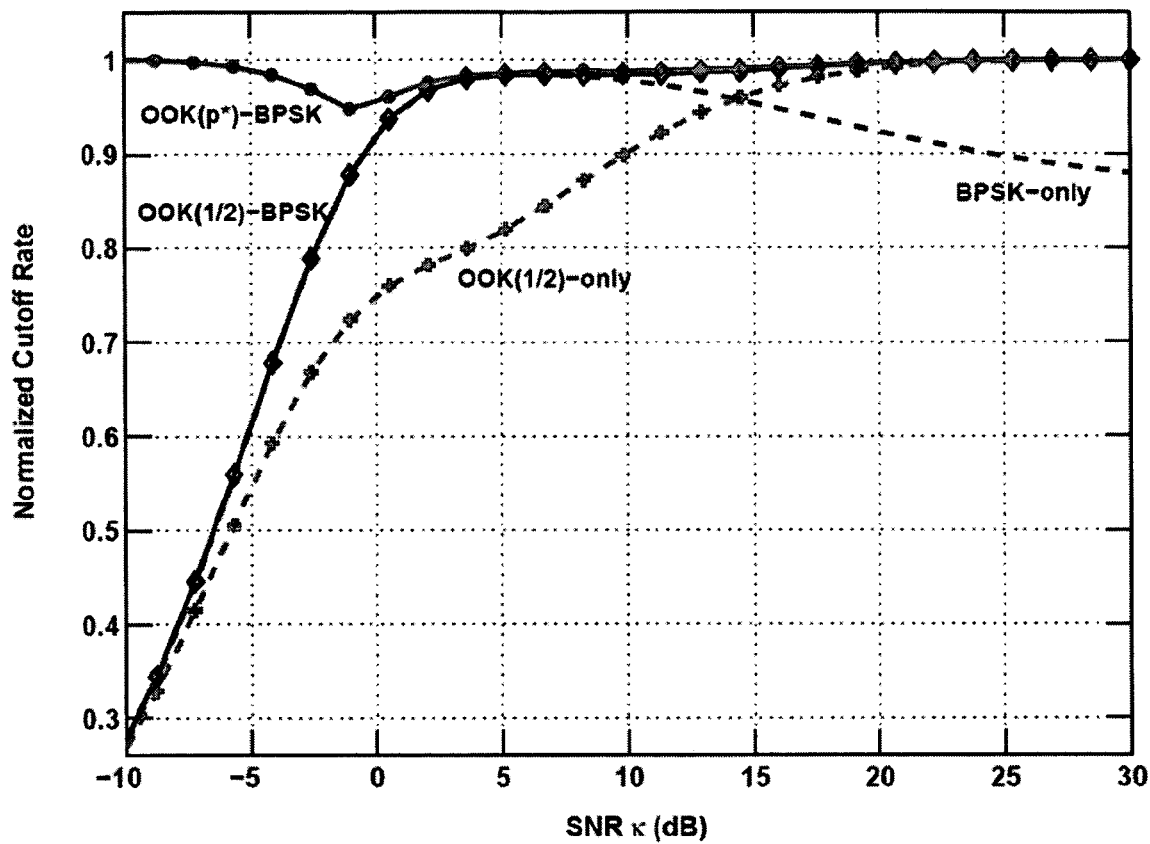
FIG. 17 is a graph of the cutoff rate of PSAM of an exemplary embodiment when using the (1,0) estimator.

The channel correlation may be described by the well-known Jakes model, for which $R_h(\tau) = J_o(2\pi f_D T_D \tau)$, where $J_o(.)$ is the zeroth-order Bessel function of the first kind, and where $f_D T_D$ is the normalized Doppler spread. Let $f_D T_D = 1/50$, and $T=7$. FIG. 17 plots the cutoff rate versus SNR (dB) for each of the schemes for the (1,0) estimator (each curve has been normalized by the cutoff rate of optimal binary signaling, scheme C3).

For small SNR, BPSK outperforms OOK $$\left(\frac{1}{2}\right).$$

At high SNR, the reverse is true. The performance of the OOK(p*)-BPSK adaptive strategy is nearly identical to that of optimal binary signaling. Therefore, using only two types of inputs, BPSK and the OOK family, is nearly optimal. Limited to the OOK $$\left(\frac{1}{2}\right) -$$

BPSK scheme, performance is nearly identical to optimal binary signaling for moderate to high SNR. This implies that nearly optimal transmission can be achieved even under transmitter peak-to-average power ratio (PAPR) constraints, simply by switching between two constellations when the SNR is moderate to large (in this example, k>2 dB).

Figure 18:
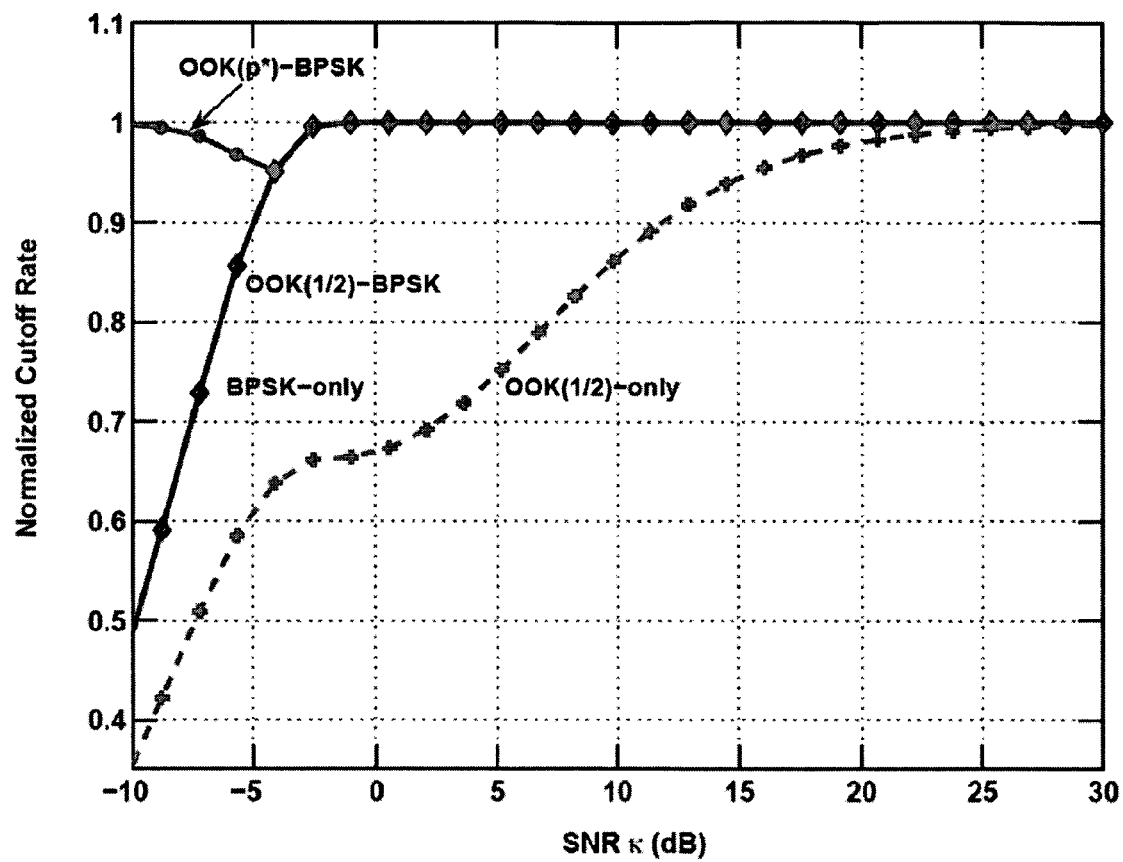
FIG. 18 is a graph of the cutoff rate of PSAM of an exemplary embodiment when using the (1,1) estimator.

In FIG. 18 the analysis is repeated for the (1,1) estimator. This estimator provides at least the CSI quality of the (1,0) estimator, implying that BPSK will be preferred to OOK in at least as many data slots. In this embodiment, BPSK is preferred to OOK in every data slot. Note that for SNR greater than −2 dB, the optimality of scheme C3 is captured by the simple OOK $$\left(\frac{1}{2}\right) -$$

BPSK adaptive scheme.

To summarize, the cutoff rate for optimal binary inputs for the Rayleigh flat-fading channel with imperfect receiver CSI is analyzed. First, the cutoff rate is evaluated for i.i.d. fading as expressed with equation (3), and the optimal binary input is analyzed as a function of the CSI quality and SNR at the receiver. CSI quality threshold, $\overset{*}{w}$, characterizes the phase transition in the optimal input versus the CSI quality at low SNR. Next, the limiting distributions—BPSK and OOK are considered. Under OOK, equations (9), (10), and (12) show that the cutoff rate provides a simple characterization of the probability versus location of the non-zero mass point as a function of the CSI quality and SNR. A transitional SNR $\overset{*}{k}$(see equation (15) and FIG. 14) enables adaptive switching between these distributions based on the CSI quality, and is nearly optimal. Next, the results are applied to adaptive modulation design in PSAM communications over a temporally correlated channel. Switching between just BPSK and equiprobable-OOK nearly achieves optimal binary signaling at moderate ($\approx$0 dB) to large SNR, and switching between BPSK and generalized-OOK is nearly optimal at all SNR.

Embodiments of the present disclosure can be implemented in hardware, software, firmware, or a combination thereof such as provided in FIG. 1. In the preferred embodiments, the method of adaptive modulation is implemented in software or firmware that is stored in a memory and that is executed by a suitable instruction execution system. If implemented in hardware, as in an alternative embodiment, the method of adaptive modulation can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The flow charts of FIGS. 2 and 3 show the architecture, functionality, and operation of a possible implementation of the adaptive modulation software. In this regard, each block represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession in may in fact be executed substantially concurrently or the blocks may sometimes be executed in the reverse order, depending upon the functionality involved, as will be further clarified hereinbelow.

The adaptive modulation program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and varia- Therefore, at least the following is claimed:
1. A method of communications comprising:
   determining a cutoff rate of a communication channel by analyzing partial channel state information (CSI and signal to noise ration (SNR) of a receiver, and
   selecting a modulation scheme for the communication channel based on the level of partial CSI and SNR through maximization of the cutoff rate and by applying analysis of causal and noncausal estimators to the model of the communication channel, wherein the modulation scheme is applied to Pilot Symbol Assisted Modulation (PSAM) communications and to a channel correlation model of the communication channel.
2. A system for communications comprising:
   a receiver configured to sample a transmission on a communications channel;
   a processor configured to determine the cutoff rate of the communication channel corresponding to a sample of a transmission on the communication channel by analyzing the partial channel state information (CSI) and signal to noise ratio (SNR) of the receiver, and to adapt the modulation scheme for the communication channel based on the level of partial CSI and SNR through maximization of the cutoff rate wherein the adaptive modulation scheme is applied to Pilot Symbol Assisted Modulation (PSAM) communication and is adjusted by applying analysis of causal and noncausal estimators to the model of the communication channel.
3. A method of communications comprising:
   determining a cutoff rate of a communication channel by analyzing partial channel state information (CSI) and signal to noise ration (SNR) of a receiver, and
   selecting a modulation scheme for the communication channel based on the level of partial CSI and SNR through maximization of the cutoff rate wherein the cutoff rate ($R_O$) is determined from equation (3):

$$R_o = -\min_{c(p, A, B)} \log_2\left[1 + 2p(1-p)\left\{\frac{\sqrt{1+k(1-w)A^2}\sqrt{1+k(1-w)B^2}}{1+\frac{k}{2}\left(1-\frac{w}{2}\right)(A^2+B^2)+\frac{k_w}{2}AB} - 1\right\}\right].$$

4. The method of claim 3, wherein the selection of the modulation scheme comprises selecting between binary phase shift key (BPSK) modulation and on-off key (OOK) modulation for the communication channel.
5. A system for communications comprising:
   a receiver configured to sample a transmission on a communications channel;
   a processor configured to determine the cutoff rate of the communication channel corresponding to a sample of a transmission on the communication channel by analyzing the partial channel state information (CSI) and signal to noise ratio (SNR) of the receiver, and to adapt the modulation scheme for the communication channel based on the level of partial CSI and SNR through maximization of the cutoff rate wherein the cutoff rate ($R_o$) is determined from equation (3):

$$R_o = -\min_{c(p, A, B)} \log_2\left[1 + 2p(1-p)\left\{\frac{\sqrt{1+k(1-w)A^2}\sqrt{1+k(1-w)B^2}}{1+\frac{k}{2}\left(1-\frac{w}{2}\right)(A^2+B^2)+\frac{k_w}{2}AB} - 1\right\}\right].$$

6. The system of claim 5, wherein the processor configured to adapt the modulation scheme selects between binary phase shift key (BPSK) modulation and on-off key (OOK) modulation for the communication channel.
7. A wireless radio comprising:
   a receiver configured to sample a transmission on a communications channel; and
   a processor configured to determine the cutoff rate of the communication channel corresponding to a sample of a transmission on the communication channel by analyzing the partial channel state information (CSI) and signal to noise ratio (SNR) of the receiver, and to adapt the modulation scheme for the communication channel based on the level of partial CSI and SNR through maximization of the cutoff rate wherein the cutoff rate ($R_O$) is determined from equation (3):

$$R_o = -\min_{c(p, A, B)} \log_2\left[1 + 2p(1-p)\left\{\frac{\sqrt{1+k(1-w)A^2}\sqrt{1+k(1-w)B^2}}{1+\frac{k}{2}\left(1-\frac{w}{2}\right)(A^2+B^2)+\frac{k_w}{2}AB} - 1\right\}\right].$$

8. The wireless radio of claim 7, wherein the processor configured to adapt the modulation scheme selects between binary phase shift key (BPSK) modulation and on-off key (OOK) modulation for the communication channel.
9. An adaptive modulation system for communications comprising:
   means for determining a cutoff rate of a communication channel by analyzing the partial channel state information (CSI) and signal to noise ratio (SNR) of a receiver; and
   means for selecting a modulation scheme for the communication channel based on the level of partial CSI and SNR through maximization of the cutoff rate wherein the cutoff rate ($R_O$) is determined from equation (3):

$$R_o = -\min_{c(p, A, B)} \log_2\left[1 + 2p(1-p)\left\{\frac{\sqrt{1+k(1-w)A^2}\sqrt{1+k(1-w)B^2}}{1+\frac{k}{2}\left(1-\frac{w}{2}\right)(A^2+B^2)+\frac{k_w}{2}AB} - 1\right\}\right].$$

10. The adaptive modulation system of claim 9, wherein the means for adapting a modulation scheme selects between binary phase shift key (BPSK) modulation and on-off key (OOK) modulation for the communication channel.

* * * * *